(12) United States Patent
Nakajima et al.

(10) Patent No.: US 9,019,378 B2
(45) Date of Patent: Apr. 28, 2015

(54) IMAGING APPARATUS INCLUDING A LENS BARREL HOLDING AN OPTICAL ELEMENT

(75) Inventors: Mitsuru Nakajima, Atsugi (JP); Toshiyuki Kawasaki, Yokohama (JP); Shinobu Kanatani, Atsugi (JP); Tetsuya Ogata, Machida (JP); Kenichi Yoshimura, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 13/074,632

(22) Filed: Mar. 29, 2011

(65) Prior Publication Data

US 2011/0242321 A1    Oct. 6, 2011

(30) Foreign Application Priority Data

Mar. 31, 2010   (JP) ................ 2010-080340

(51) Int. Cl.
  *H04N 5/225*   (2006.01)
  *H04N 7/18*   (2006.01)
  *G02B 13/00*   (2006.01)
  *G02B 7/02*   (2006.01)

(52) U.S. Cl.
  CPC ........... *H04N 5/2254* (2013.01); *H04N 5/2252* (2013.01); *G02B 7/021* (2013.01); *G02B 13/001* (2013.01)

(58) Field of Classification Search
  CPC . H04N 5/2254; H04N 5/2253; H04N 5/2257; G02B 7/025
  See application file for complete search history.

(56) References Cited

U.S. PATENT DOCUMENTS

| | | | |
|---|---|---|---|
| 5,400,072 A * | 3/1995 | Izumi et al. ................ | 348/335 |
| 6,507,700 B1 | 1/2003 | Takekuma et al. | |
| 6,949,620 B2 | 9/2005 | Aida et al. | |
| 7,488,145 B2 | 2/2009 | Watanabe et al. | |
| 7,773,305 B2 | 8/2010 | Yoshida et al. | |
| 2003/0184885 A1 | 10/2003 | Tansho et al. | |
| 2004/0154724 A1* | 8/2004 | Takemoto et al. ............ | 156/85 |
| 2004/0223074 A1 | 11/2004 | Takada | |
| 2005/0206780 A1 | 9/2005 | Iwasaki et al. | |
| 2007/0051646 A1 | 3/2007 | Imoto et al. | |

(Continued)

FOREIGN PATENT DOCUMENTS

| | | |
|---|---|---|
| CN | 101281281 A | 10/2008 |
| JP | 5-49601 | 3/1993 |

(Continued)

OTHER PUBLICATIONS

U.S. Appl. No. 13/037,571, filed Mar. 1, 2011, Tanaka, et al.

(Continued)

*Primary Examiner* — Christopher S Kelley
*Assistant Examiner* — Mohammed Jebari
(74) *Attorney, Agent, or Firm* — Oblon, McClelland, Maier & Neustadt, L.L.P.

(57) ABSTRACT

An imaging apparatus includes: a lens barrel which holds at least one optical element; an image sensor which converts an image of a photographic subject obtained by the optical element into an electrical signal; a circuit board on which the image sensor is mounted; and a fixing wall body which is a different body from the lens barrel, and where the lens barrel is mounted to an end part of the fixing wall body on a photographic subject side, and the circuit board is mounted to an end part of the fixing wall body on a side opposite to the photographic subject side by a bond structure by an adhesive agent.

28 Claims, 15 Drawing Sheets

(56) References Cited

U.S. PATENT DOCUMENTS

| | | |
|---|---|---|
| 2007/0280667 A1 | 12/2007 | Shin |
| 2008/0239525 A1 | 10/2008 | Chan |
| 2008/0316623 A1 | 12/2008 | Aoki et al. |
| 2009/0079863 A1 | 3/2009 | Aoki et al. |
| 2009/0207276 A1 | 8/2009 | Kawasaki |
| 2009/0208136 A1 | 8/2009 | Kawasaki |
| 2009/0225451 A1 | 9/2009 | Chiang |
| 2009/0245767 A1 | 10/2009 | Sakai et al. |
| 2010/0019129 A1 | 1/2010 | Ishigaki et al. |
| 2010/0067080 A1 | 3/2010 | Shimizu et al. |
| 2010/0259616 A1 | 10/2010 | Nakajima et al. |
| 2011/0234803 A1 | 9/2011 | Nakajima et al. |

FOREIGN PATENT DOCUMENTS

| | | |
|---|---|---|
| JP | 2002-90603 | 3/2002 |
| JP | 2003-298888 | 10/2003 |
| JP | 2005-266276 | 9/2005 |
| JP | 2005-295050 | 10/2005 |
| JP | 2006-106716 | 4/2006 |
| JP | 2007-62670 | 3/2007 |
| JP | 2008-33010 | 2/2008 |
| JP | 2008-187284 | 8/2008 |
| JP | 2009-115847 | 5/2009 |
| JP | 2009-290527 | 12/2009 |
| JP | 2010-263606 | 11/2010 |
| JP | 2011-154058 | 8/2011 |
| JP | 2011-209417 | 10/2011 |
| JP | 2011-211366 | 10/2011 |
| WO | WO 2008/093463 A1 | 8/2008 |

OTHER PUBLICATIONS

U.S. Appl. No. 13/073,451, filed Mar. 28, 2011, Nakajima, et al.

Extended European Search Report issued Jul. 14, 2011, in Patent Application No. 11160733.9.

Chinese Office Action issued Mar. 1, 2013, in China Patent Application No. 201110079817.9 (with English translation).

Japanese Office Action issued in corresponding application No. 2010-080340 on Feb. 4, 2014.

\* cited by examiner

IMAGING APPARATUS INCLUDING A LENS BARREL HOLDING AN OPTICAL ELEMENT

CROSS-REFERENCE TO RELATED APPLICATIONS

The present application is based on and claims priority from Japanese patent application number 2010-80340, filed Mar. 31, 2010, the disclosure of which is hereby incorporated by reference herein in its entirety.

BACKGROUND

The present invention relates to an imaging apparatus used as a digital camera, a digital video camera, or the like, and in particular relates to an imaging apparatus suitable for an in-vehicle camera.

An imaging apparatus having an optical element such as a lens for imaging or the like, and an image sensor such as a CCD (Charge-Coupled Device), a CMOS (Complementary Metal Oxide Semiconductor) or the like is widely used in an in-vehicle camera, a digital camera, a digital video camera or the like.

In the above imaging apparatus, normally, at an image forming position of an optical element, an image sensor is fixed in a state where a high-accuracy positioning adjustment has been performed, and the optical element and the image sensor are stored in a case body. And in some cases, the optical element and the case body are integrated. The case body has a waterproof function and a dustproof function.

On the other hand, as for an in-vehicle camera or the like, depending on usages, there is a case where models of which the external shapes are similar but specifications of lenses and image sensors are slightly different are needed. For example, even though the same lens can be used, in the case of an analog output and in the case of a digital output, there is a case where different kinds of image sensors have to be used. And there are cases such that in a case where a high-accuracy image is needed, an image sensor having pixels in a small size is used, and in the case of using in a dark place, an image sensor having pixels in a large size and a high imaging sensitivity is used. In these cases, even though the same lens can be used, there is a case where different kinds of image sensors have to be used.

And even in the case of using the same image sensor, there is a case where different lenses are needed. For example, in a case where an in-vehicle camera is used for a rear-view monitor, it is preferable that a horizontal angle of view (visible range) be wider, and in a case where an in-vehicle camera is used for an obstacle detection, it is preferable that a particular range look larger. In this case, different lenses are used for the same image sensor (there is a case where an electrical component system is included.)

Incidentally, as a conventional imaging apparatus, an imaging apparatus has been proposed in which a case body is divided into a front case and a rear case, and in the front case a lens, a lens barrel and an image sensor are arranged such that each optical axis corresponds, and an O-ring interposes between the front case and the rear case, and thereby the degree of freedom in positioning of the image sensor for the lens is ensured and waterproof and dustproof functions of the apparatus are improved (see Japanese patent application publication number 2008-33010).

Additionally, an imaging apparatus has also been proposed which is configured such that a lens barrel holding a lens is integrally formed with a case body, and a circuit board having an image sensor is screwed to a screw of an inner circumferential surface of the case body, and in which a distance between the lens and the image sensor is adjustable by rotating the lens (or the circuit board) (see Japanese patent application publication number 2009-290527).

However, in the imaging apparatus disclosed in Japanese patent application publication number 2008-33010 of the above conventional imaging apparatuses, the following problem occurs when an image sensor where a thickness in the optical axis direction is different is mounted in the front case.

As types of an image sensor, a QFP (Quad Flat Package), which is thick and large, and a CSP (Chip Size Package), which is thin and small, are known. Here, when the QFP is arranged in a case body suitable for the CSP, a front case of the case body and a circuit board are too distant to bond the front case to the circuit board, because a distance between a pixel surface of the image sensor and the circuit board of the QFP is large. On the other hand, when the CSP is arranged in a case body suitable for the QFP, a front case of the case body and a circuit board are too close, and therefore the front case interferes with the circuit board, because a distance between a pixel surface of the image sensor and the circuit board of the CSP is small.

In order to avoid such a problem, a suitable form of a case body for a form of an image sensor is required. However, this causes a new problem such that a great number of components are needed. And additionally, a lens barrel is needed to be molded with high accuracy in order to hold a lens, and in some cases, it is needed to be molded with an accuracy of approximately a few μm. It is very difficult to manufacture a lens barrel with such accuracy, and in addition there is a case where a difference in form occurs. In that case, assembly accuracy of the lens is deteriorated, and even in a case where an assembled lens group has the same lens constitution, an optical characteristic is different.

If a lens barrel is only manufactured with high accuracy, manufacture of the lens barrel by cutting aluminum or the like is considered. However, it is not preferable to manufacture a constitution of the lens barrel including a bonded part by cutting aluminum from the viewpoint of mass production performance. This is because secondary processing is needed, even in the case of die-casting, in order to manufacture a form of the bonded part with high accuracy.

Additionally, in the imaging apparatus disclosed in Japanese patent application publication number 2009-290527, a movable range of the image sensor is wide, and if a thickness of the image sensor in the optical axis direction is changed, there is no problem in adjusting the distance between the lens and the image sensor. However, in a constitution disclosed in Japanese patent application publication number 2009-290527, the distance between the lens and the image sensor is adjusted by rotating the image sensor (or the lens). Therefore, in a case where a case body of a lens barrel holding the lens is a quadrangle in a cross-section perpendicular to the optical axis, four sides of the image sensor and four sides of the case body do not always correspond, and an arrangement direction of the case body is limited. In the imaging apparatus disclosed in Japanese patent application publication number 2009-290527, in order to avoid this, the case body where the lens is stored is limited to a circular cylinder shape.

SUMMARY

An object of the present invention is to provide an imaging apparatus in which commonalization of components, a suitable optical characteristic, maintaining a stable sealing performance around an optical element, and ensuring a degree of freedom in design of a case body are achieved.

In order to achieve the above object, an embodiment of the present invention provides: an imaging apparatus comprising: a lens barrel which holds at least one optical element; an image sensor which converts an image of a photographic subject obtained by the optical element into an electrical signal; a circuit board on which the image sensor is mounted; and a fixing wall body which is a different body from the lens barrel, and where the lens barrel is mounted to an end part of the fixing wall body on a photographic subject side, and the circuit board is mounted to an end part of the fixing wall body on a side opposite to the photographic subject side by a bond structure by an adhesive agent.

BRIEF DESCRIPTION OF THE DRAWINGS

FIG. 11A is a diagram illustrating a state where a gap between two positioned members is filled with an adhesive agent, and FIG. 11B is a diagram illustrating a state where both members are relatively displaced by a cure shrinkage of the adhesive agent, and FIG. 11C is a diagram illustrating a state where the two positioned members are bonded by an indirect bond structure, and FIG. 11D is a diagram illustrating a state where the both members are bonded by the indirect bond structure.

DETAILED DESCRIPTION OF THE PREFERRED EMBODIMENTS

Hereinafter, embodiments of the present invention will be explained in detail in accordance with the drawings.

First Embodiment

An imaging apparatus 10 according to a first embodiment of the present invention as an example will be explained by use of FIGS. 1 to 10.

Figure 1:
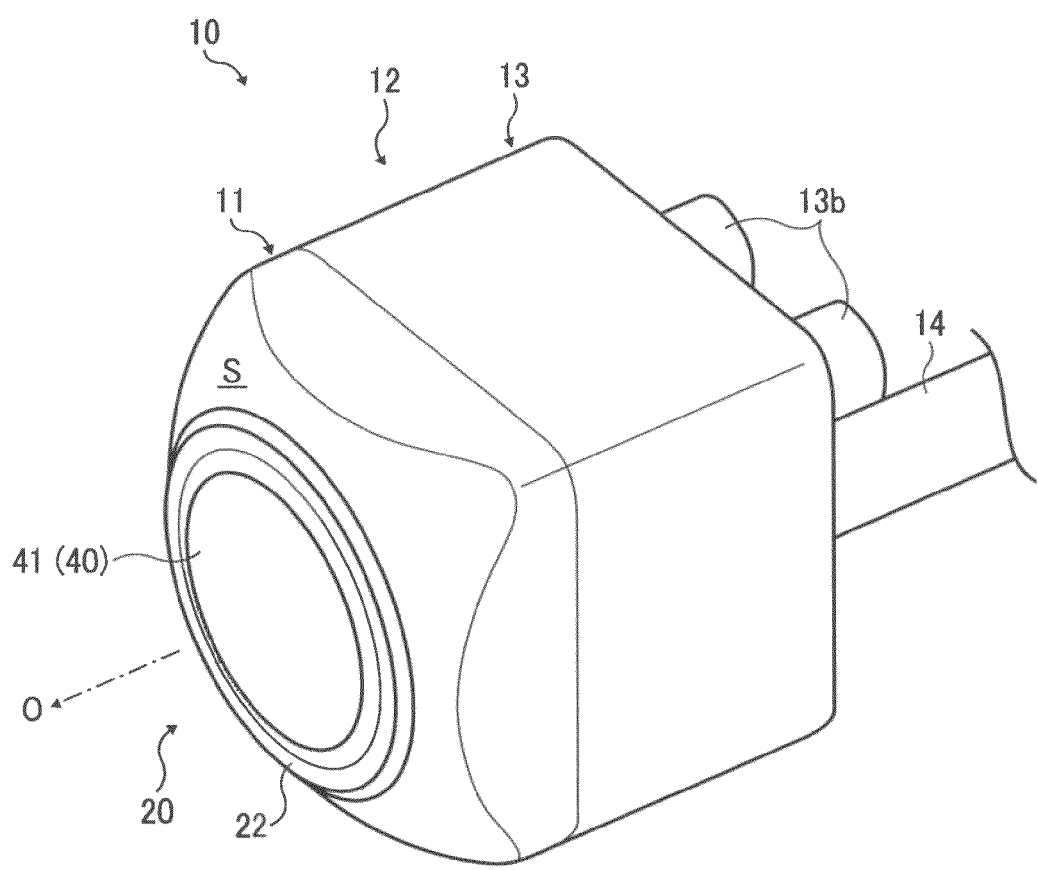
FIG. 1 is an exterior perspective diagram of an imaging apparatus according to a first embodiment of the present invention.
Figure 2:
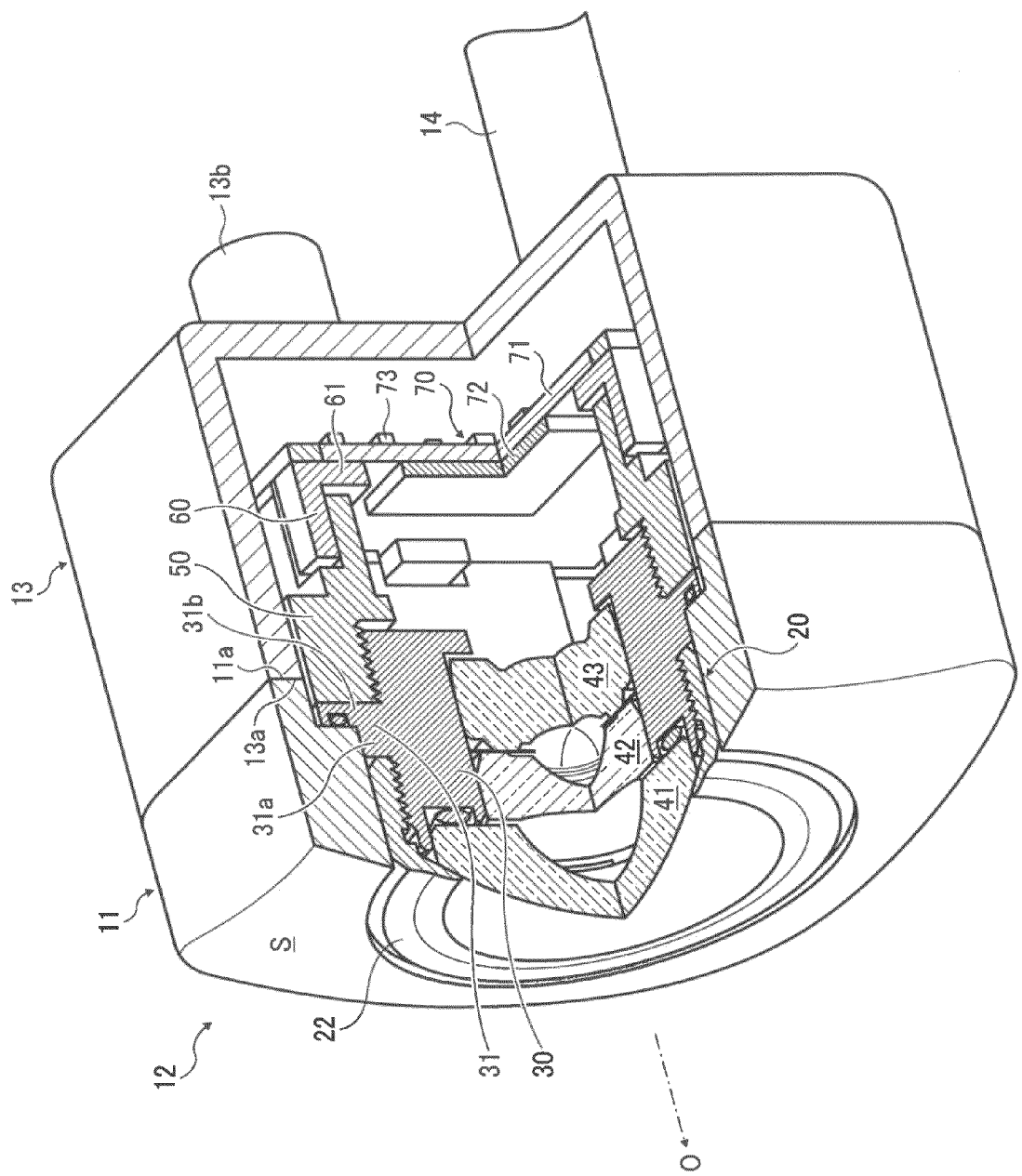
FIG. 2 is a perspective diagram illustrating an internal constitution of the imaging apparatus of FIG. 1.

The imaging apparatus 10, as illustrated in FIGS. 1 and 2, includes a front case part 11, an imaging optical system 20 (in FIG. 1, a lens 41 and a front end part of an optical element holder 22, which are described later, are shown), and an electrical component mounted circuit board part 70, and the imaging optical system 20 and the electrical component mounted circuit board part 70 are mounted to the front case part 11.

The front case part 11 forms an outer surface S surrounding at least the imaging optical system 20, and the imaging apparatus 10 is capable of being mounted to a desired place. The front case part 11, in the present embodiment, has a rectangular shape in a plane perpendicular to a photographing optical axis O, and has a rectangular parallelepiped shape overall. The front case part 11 constitutes a front side (a side close to a photographic subject: hereinafter, simply referred to as a photographic subject side) part of a case body 12. The front case part 11 is capable of being mounted to a rear case part 13 that constitutes a rear side (a side close to the electrical component mounted circuit board part 70: hereinafter, simply referred to as a circuit board side) part of the case body 12.

A rear end face 11a of the front case part 11 is connected so as to face a front end face 13a of the rear case part 13 by a screw or the like in a state where a sealing member (for example, an O-ring, a flat packing, or the like, which is not illustrated) is interposed. Thus, in a part where the front case part 11 and the rear case part 13 are connected, the case body 12 having a waterproof function and a dustproof function (hereinafter, referred to as sealing performance) is formed. A dimension in the plane perpendicular to the photographing optical axis O of the front case part 11 is set based on a positional relationship between the front case part 11 and the imaging optical system 20 in a lens barrel 30, as described later.

Figure 3:
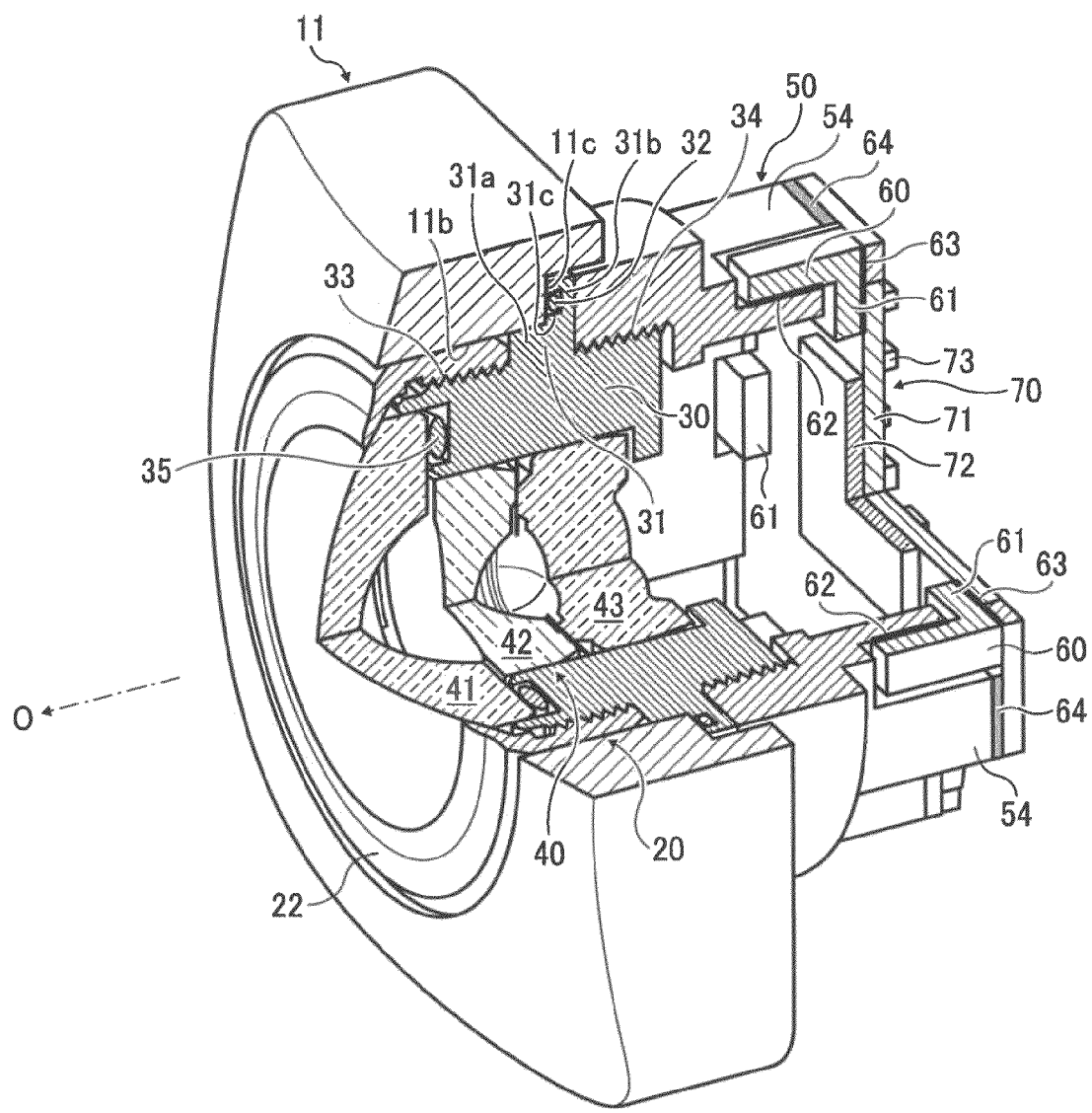
FIG. 3 is a perspective diagram illustrating a state of detaching a rear case part from a constitution of FIG. 2.

In the front case part 11, as illustrated in FIG. 3, a hole 11b for insertion in a circular cylinder shape which is capable of receiving the lens barrel 30 of the imaging optical system 20 is provided. An inner diameter of the hole 11b for insertion is formed such that an inner diameter on the circuit board side is larger than an inner diameter on the photographic subject side.

Thus, since the inner diameter of the hole 11b for insertion of the front case part 11, as described above, is formed such that the inner diameter on the photographic subject side is larger than the inner diameter on the circuit board side, a level difference 11c is formed in the hole 11b for insertion. And the level difference 11c performs a function of positioning of the lens barrel 30 (positioning in the direction of the photographing optical axis O). That is, the level difference 11c constitutes a positioning section.

The rear case part 13, as illustrated in FIGS. 1 and 2, has a box shape with one end open, and in cooperation with the front case part 11, forms the case body 12 that stores the imaging optical system 20 and the electrical component mounted circuit board part 70 (image sensor 72). A dimension (depth) of the rear case part 13 is capable of storing the lens barrel 30 including the imaging optical system 20, a fixing wall body 50 which is described later, and the electrical component mounted circuit board part 70 connected to the fixing wall body 50.

In the rear case part 13, at a rear end side, two mounting projections 13b for mounting the case body 12 including the imaging apparatus 10 in a desired position are provided. In the present embodiment, both the mounting projections 13b serve as a boss section where a screw hole is provided, which is not illustrated. And additionally, in the rear case part 13, an electrical cable 14 is provided that supplies electrical power to the electrical component mounted circuit board part 70 (a later-described electrical components 73), and sends image data obtained by the image sensor 72 mounted on the electrical component mounted circuit board part 70, which is described later. The electrical cable 14 is connected to the electrical component mounted circuit board part 70 in the state of having the sealing performance in the rear case part 13. As constitutions having the sealing performance, there is a constitution in which in the rear case part 13 a connection hole (not illustrated) is provided, and through which the electrical cable 14 is inserted, and a waterproof adhesive agent fills its surrounding area, and a constitution in which the electrical cable 14 (its coating member) is integrally formed with the rear case part 13. In a case where the rear case part 13 is not mounted to the front case part 11, the electrical cable 14 is directly connected to the electrical component mounted circuit board part 70. The imaging optical system 20 is mounted to the front case part 11, which is capable of being connected to the rear case part 13.

The imaging optical system 20 includes an optical element group 40 held in the lens barrel 30. The lens barrel 30 has a cylinder shape to hold the optical element group 40 inside. As illustrated in FIG. 2, an inner diameter of the lens barrel 30 is large on the photographic subject side and becomes gradually smaller on the circuit board side. On an outer circumferential surface of the lens barrel 30, a convex part 31 is formed in an intermediate part of the photographing optical axis O. The convex part 31 is formed to encircle the outer circumferential surface of the lens barrel 30. In the convex part 31, a front convex part 31a having a small outer diameter is provided on the photographic subject side and a rear convex part 31b having a large outer diameter is provided on the circuit board side. The front convex part 31a and the rear convex part 31b are integrated.

Figure 4:
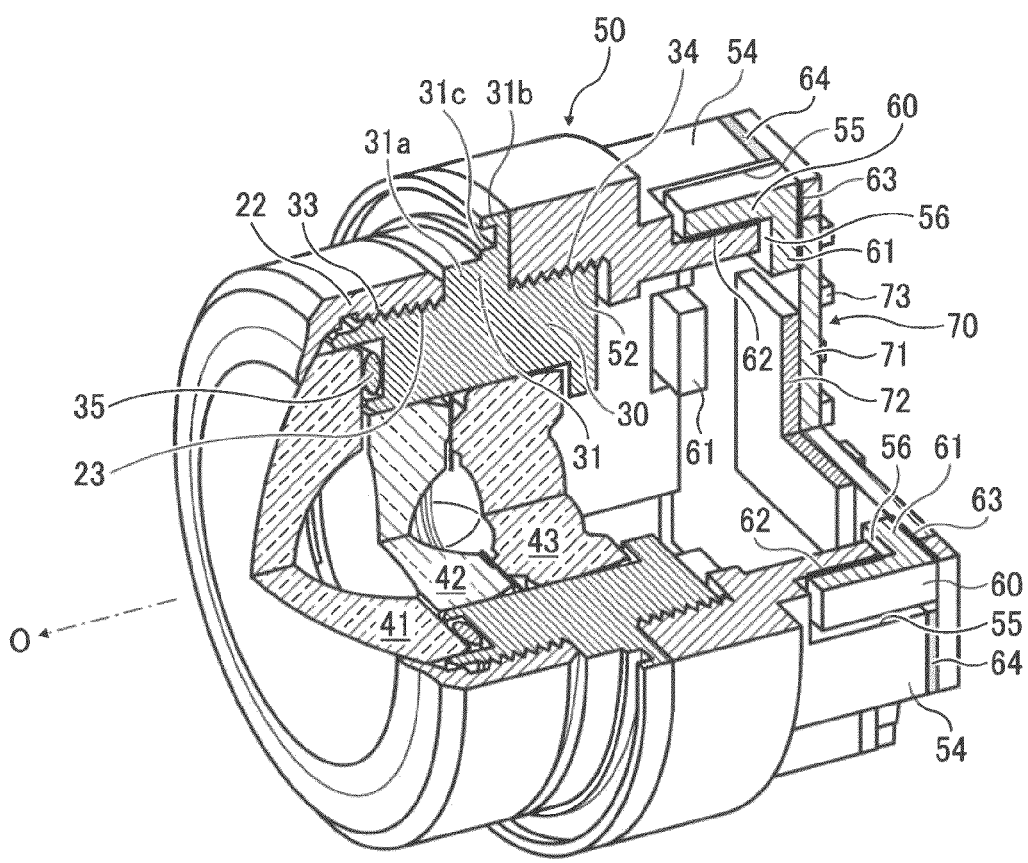
FIG. 4 is a perspective diagram illustrating a state of detaching a front case part from a constitution of FIG. 3.

On a side wall on the photographic subject side of the rear convex part 31b, an O-ring groove 31c (see FIG. 4) that encircles the convex part 31 along the outer circumferential surface of the lens barrel 30 is formed. And in the O-ring groove 31c, an O-ring 32 is fitted. The O-ring 32 is an elastic member for waterproofing. On the outer circumferential surface of the lens barrel 30, as illustrated in FIG. 4, a male screw thread 33 is formed on the photographic subject side from the convex part 31 and a male screw thread 34 is formed on the circuit board side from the convex part 31.

As described above, an inner diameter on the photographic subject side of the lens barrel 30 is large, and an inner diameter on the circuit board side of the lens barrel 30 is small, and an inner diameter of the lens barrel 30 has an intermediate dimension in an intermediate part which is between the photographic subject side and the circuit board side. On the photographic subject side of the lens barrel 30, the lens 41 is disposed, and in the intermediate part of the lens barrel 30, lenses 42, and 43 are disposed. On the circuit board side of the lens barrel 30, the lens 43 is locked, and therefore the lens 43 does not detach from the lens barrel 30.

On the outer circumferential surface on the circuit board side of the lens barrel 30, the optical element holder 22 in a ring shape is provided. On an inner circumferential surface of the optical element holder 22, a female screw thread 23 is formed, and the female screw thread 23 screws on the male screw thread 33, and thereby the optical element group 40 including the lenses 41, 42, and 43 is held in the lens barrel 30.

Between the lens 41 and an end face on the photographic subject side of the lens barrel 30, an O-ring 35 is also provided, and contributes to hold the sealing performance inside the lens barrel 30.

The optical element group 40 forms a focused image of a photographic subject at an arbitrary position, and can have at least one lens, and can be suitably constituted depending on desired optical performance in an imaging apparatus 10 (imaging optical system 20).

Figure 9:
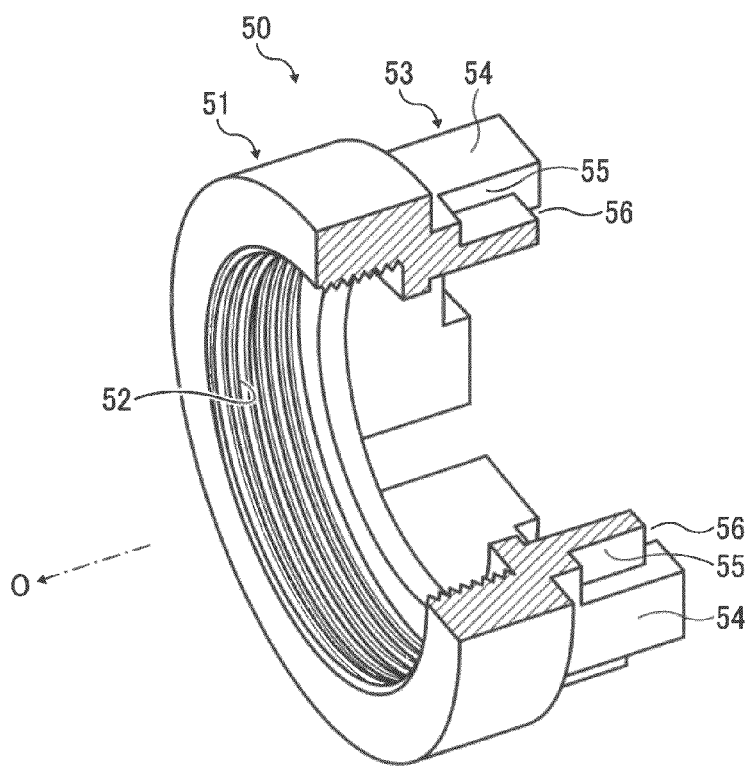
FIG. 9 is a cross-sectional perspective diagram of the fixing wall body.
Figure 10:
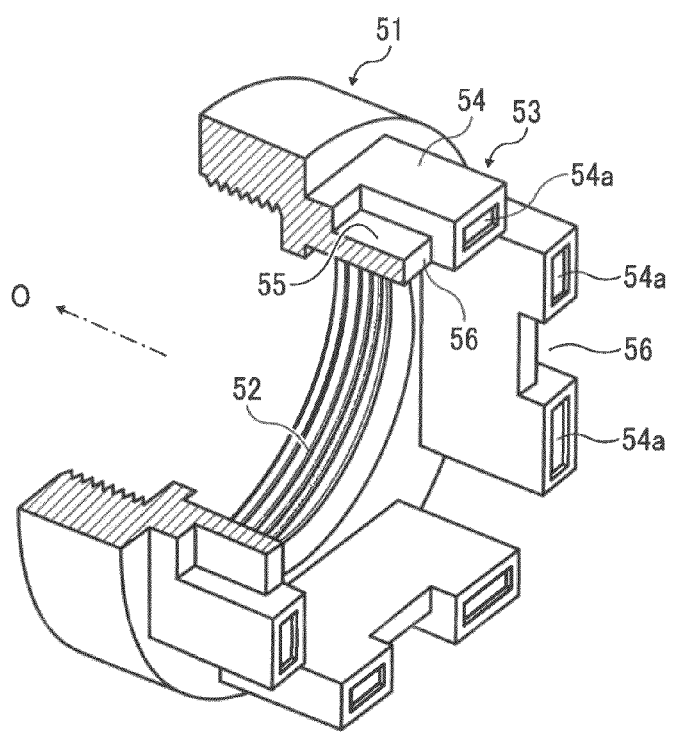
FIG. 10 is a perspective diagram of the fixing wall body of FIG. 9 seen from a different angle.

On the circuit board side of the lens barrel 30, a fixing wall body 50 is provided. The fixing wall body 50 is a different body from the lens barrel 30. As illustrated in FIGS. 9 and 10, the photographic subject side of the fixing wall body 50 is formed in a circular cylinder shape, and the circuit board side of the fixing wall body 50 is formed in a shape to have a wall-shaped projection.

On an inner circumferential surface of a circular cylinder shaped part 51 of the fixing wall body 50, a female screw thread 52 is formed. The female screw thread 52 screws on the male screw thread 34 of the lens barrel 30. By this screwing, the fixing wall body 50 is firmly fixed to the lens barrel 30 (see FIG. 4).

As illustrated in FIGS. 9 and 10, on the circuit board side of the fixing wall body 50, four fixing walls 54 respectively formed in a rectangular shape seen from the side are disposed to surround the photographing optical axis O, and form an end part 53. Adjacent fixing walls 54 are not in contact, and a space is formed between adjacent fixing walls 54. The space is a necessary space, in a case where the circuit board of the present embodiment is adjusted by an assembly machine, to prevent an arm of the assembly machine from interfering with the fixing walls 54 when the arm holds the circuit board, and if the arm holds the circuit board without interfering with the fixing walls 54, the space is not necessary and the fixing walls 54 can be contacted with each other.

On each outer surface of the fixing walls 54, a groove part 55 which extends along the photographing optical axis O is respectively formed. Each groove part 55 is formed in a rectangular parallelepiped shape and reaches an open end on the circuit board side of the end part 53. And on each outer surface of the fixing walls 54, in the vicinity of the open end on the circuit board side, an opening 56 in a quadrangular shape is respectively formed corresponding to each groove part 55. At each open end on the circuit board side of the fixing walls 54, as illustrated in FIG. 10, a concave part 54a which is in a quadrangular shape and shallow is respectively formed.

Figure 5:
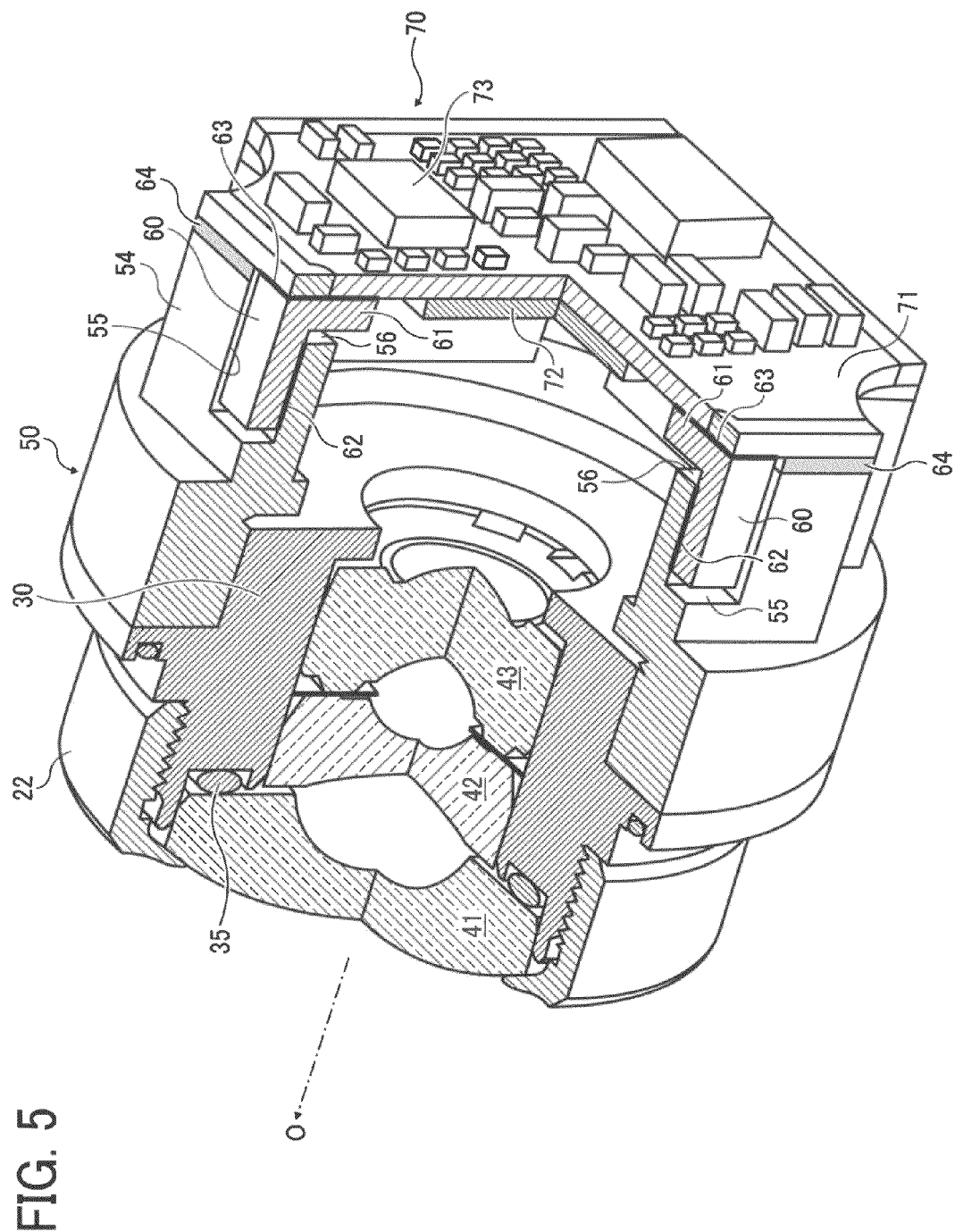
FIG. 5 is a perspective diagram of a constitution of FIG. 4 seen from a different angle.

Each member 60 for fixing which fixes the electrical component mounted circuit board part 70 is fitted in each groove part 55 formed on each outer surface of the fixing walls 54. As illustrated in FIGS. 3 to 5, a cross-section in the direction of the photographing optical axis O of the member 60 for fixing has a letter L shape, and a bended part 61 on the circuit board side of the member 60 for fixing is inserted in the opening 56 formed on the fixing wall body 50. An end of the bended part 61 reaches inside of the fixing wall body 50.

A part other than the bended part 61 of the member 60 for fixing is bonded on a bottom surface of the groove part 55 of the fixing wall body 50 with an adhesive agent 62. An outer plane surface part of the bended part 61 of the member 60 for fixing is bonded on the electrical component mounted circuit board part 70 with an adhesive agent 63. The electrical component mounted circuit board part 70 is bonded on the open end on the circuit board side of the end part 53 of the fixing wall body 50 with an adhesive agent 64.

Here, a bonded part (a bonded part with the adhesive agent 62) between the groove part 55 of the fixing wall body 50 and the member 60 for fixing and a bonded part (a bonded part with the adhesive agent 63) between the bended part 61 of the member 60 for fixing and the electrical component mounted circuit board part 70 function to fix the electrical component mounted circuit board 70 to the fixing wall body 50 via the member 60 for fixing, and constitutes an indirect bond structure. And a gap is formed between the open end on the circuit board side of the fixing wall 54 of the fixing wall body 50 and the electrical component mounted circuit board part 70, and the fixing wall body 50 and the electrical component mounted circuit board part 70 are bonded by filling the gap with the adhesive agent 64, and this bonded part constitutes a gap-filling bond structure. As described above, since the concave part 54a is formed on the open end on the circuit board side of the fixing wall 54 of the fixing wall body 50, it is possible to increase fixing strength between the fixing wall body 50 and the electrical component mounted circuit board part 70 with the adhesive agent 64.

The electrical component mounted circuit board part 70 includes a circuit board 71 in an approximately quadrangle shape, the image sensor 72 in a quadrangle shape which is mounted on a center part of a surface (surface on the photographic subject side) of the circuit board 71, and a plurality of electrical components 73 mounted on the surface of the circuit board 71.

As described above, a characteristic part of the present embodiment is that the fixing wall body 50, which is a different body from the lens barrel 30, is provided, and the fixing wall body 50 is bonded on the member 60 for fixing, and then the electrical component mounted circuit board part 70 is bonded on the member 60 for fixing, and thereby the electrical component mounted circuit board part 70 is supported by the indirect bond structure via the member 60 for fixing and the electrical component mounted circuit board part 70 is supported by the gap-filling bond structure at the open end on the circuit board side of the fixing wall body 50.

Next, an assembling method of the imaging apparatus 10 according to the present embodiment will be explained.

Figure 8:
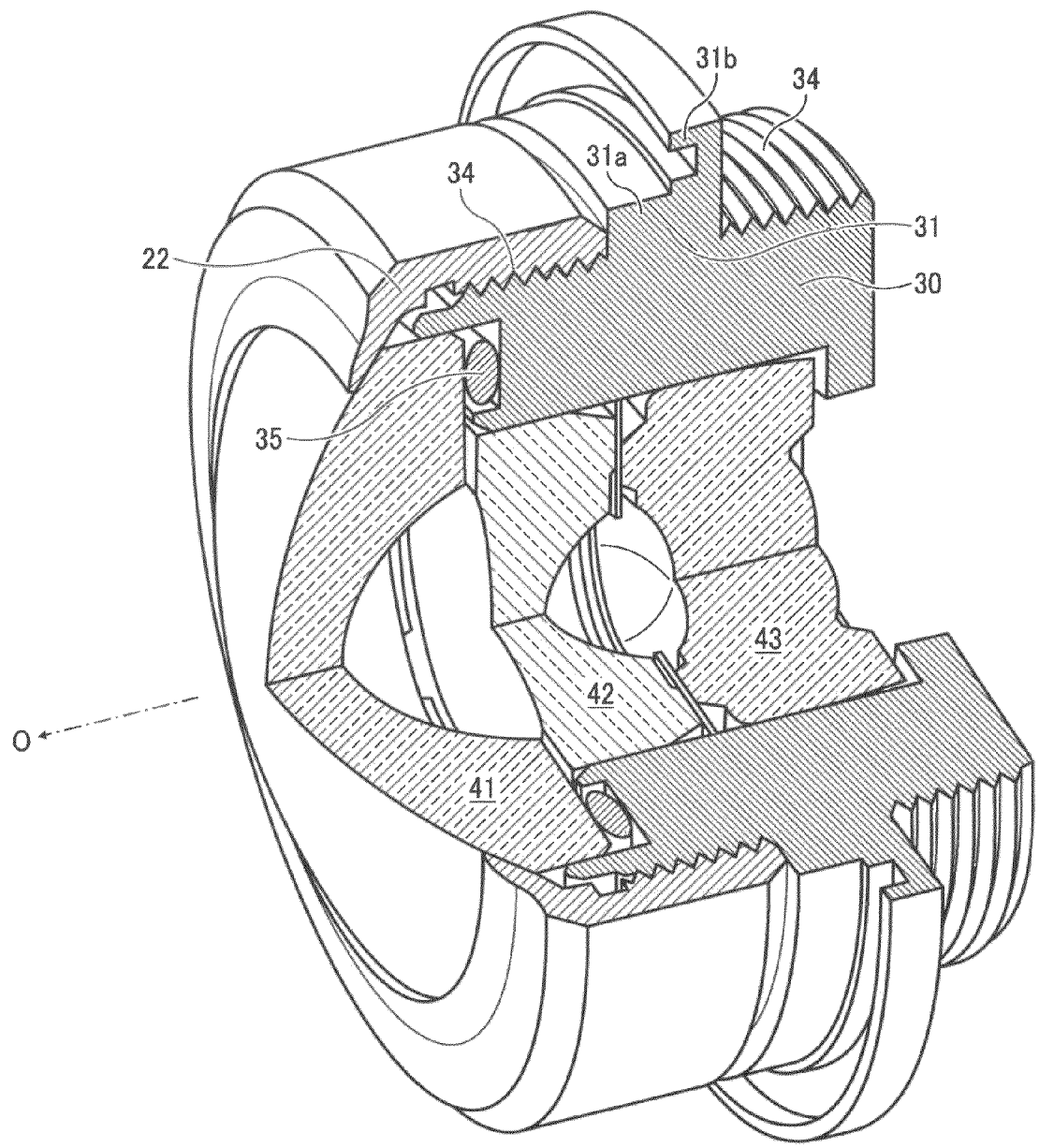
FIG. 8 is a perspective diagram illustrating a state of detaching a fixing wall body from the constitution of FIG. 6.

Firstly, as illustrated in FIG. 8, the optical element holder 22 is set on the photographic subject side of the lens barrel 30 in which the lenses 41, 42, and 43 have been incorporated. In particular, the female screw thread 23 (see FIG. 4) on the inner circumferential surface of the optical element holder 22 is screwed on the male screw thread 33 (see FIG. 4) on the outer circumferential surface of the lens barrel 30, and the optical element holder 22 is screwed until an end face on the circuit board of the optical element holder 22 comes into contact with a side face on the photographic subject side of the front convex part 31a of the lens barrel 30. This makes it possible to incorporate the optical element group 40 including the lenses 41, 42, and 43 in the lens barrel 30.

Figure 6:
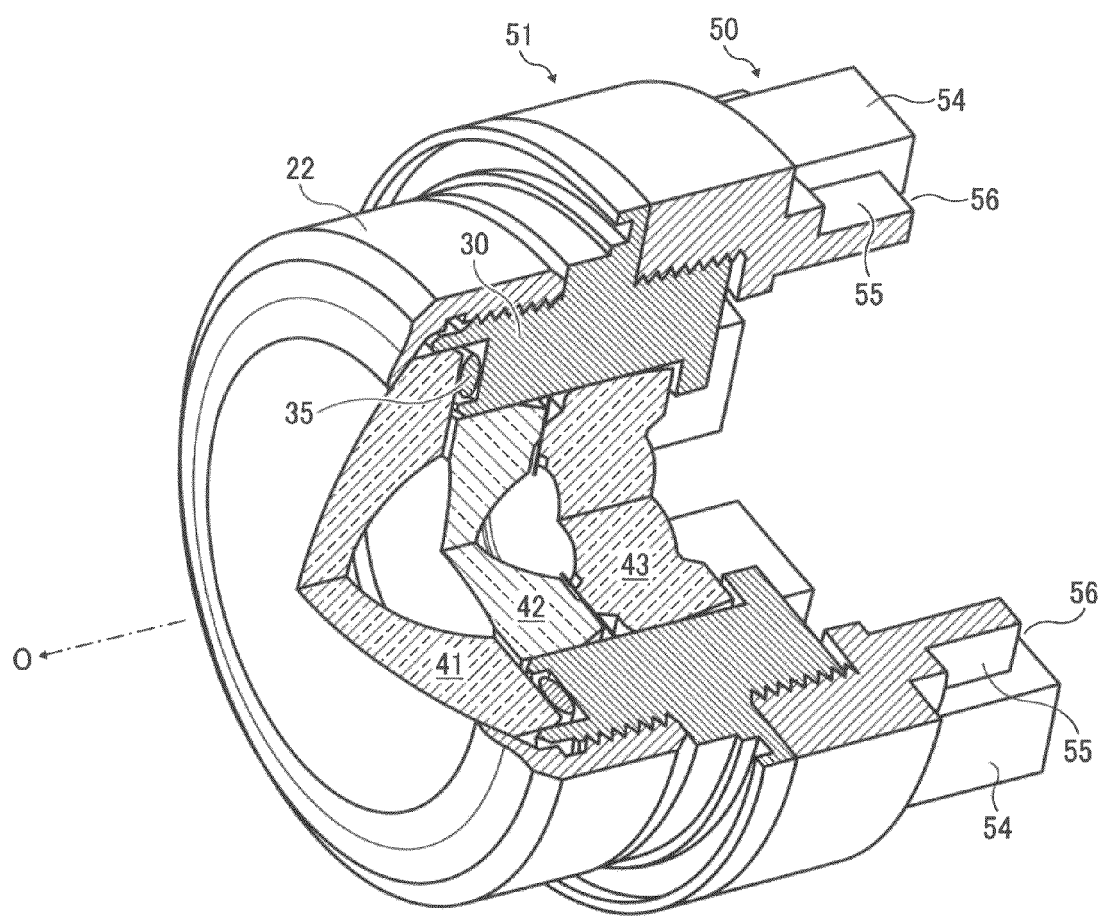
FIG. 6 is a perspective diagram illustrating a state of detaching an electrical component mounted circuit board part and a member for fixing from the constitution of FIG. 4.
Figure 7:
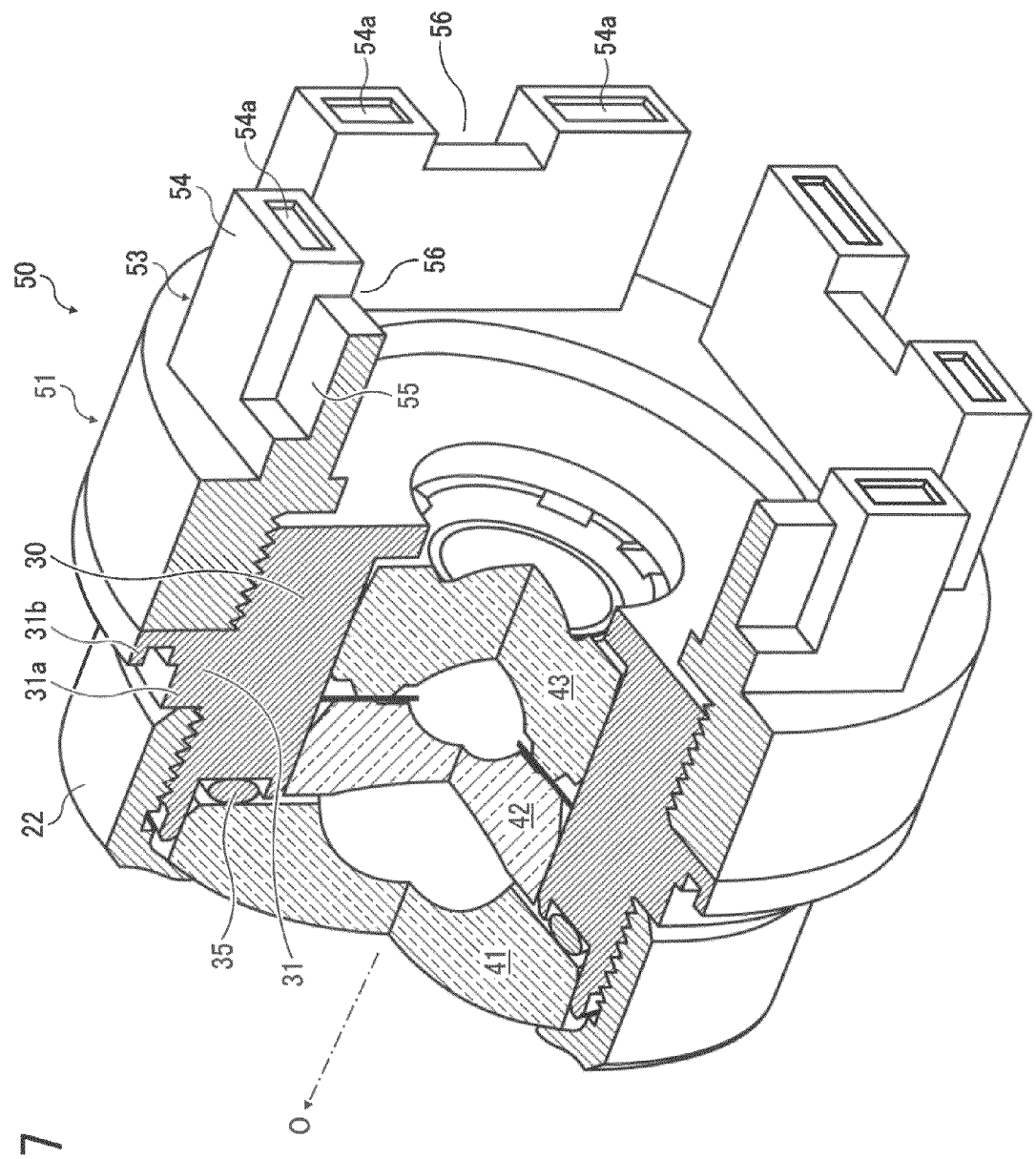
FIG. 7 is a perspective diagram of a constitution of FIG. 6 seen from a different angle.

Next, as illustrated in FIGS. 6 and 7, the fixing wall body 50 is set on the circuit board side of the lens barrel 30. In particular, the female screw thread 52 (see FIG. 9) formed on the inner circumferential surface of the circular cylinder shaped part 51 of the fixing wall body 50 is screwed on the male screw thread 34 formed on the outer circumferential surface of the lens barrel 30 (see FIG. 8), and the fixing wall body 50 is screwed until an end face on the photographic subject side of the fixing wall body 50 comes into contact with a side face on the circuit board side of the rear convex part 31b of the lens barrel.

And then, an assembly including the lens barrel 30 and the fixing wall body 50 is mounted to an assembly machine (not illustrated), and an adjustment of the electrical component mounted circuit board part 70 is performed. Firstly, the power of the electrical component mounted circuit board part 70 is turned on, and an object at a predetermined distance is imaged, and an image signal is taken out for the adjustment. And based on the image signal, the adjustment of the electrical component mounted circuit board part 70 is performed. And then, the electrical component mounted circuit board part 70 is mounted to the fixing wall body 50 integrated with the lens barrel 30.

And, as illustrated in FIGS. 4 and 5, the member 60 for fixing is mounted to the fixing wall body 50, and the electrical component mounted circuit board part 70 on which the image sensor 72, the electrical components 73 and the like have been mounted beforehand is mounted to the bended part 61 of the member 60 for fixing. In particular, firstly, the bended part 61 of the member 50 for fixing is inserted in the opening 56 of the fixing wall body 50, and the member 60 for fixing comes into close contact with the groove part 55 formed on the fixing wall 54 of the fixing wall body 50, and the member 60 for fixing is bonded on the bottom face of the groove part 55 with the adhesive agent 62. And the electrical component mounted circuit board part 70 is bonded on the bended part 61 of the member 60 for fixing with the adhesive agent 63. At this time, since the gap is formed between the open end on the circuit board side of the fixing wall 54 of the fixing wall body 50 and the electrical component mounted circuit board part 70, the gap is filled with the adhesive agent 64. The open end on the circuit board side of the fixing wall 54 and the electrical component mounted circuit board part 70 are bonded with the adhesive agent 64.

Next, as illustrated in FIG. 3, the front case part 11 is mounted on the photographic subject side of the lens barrel 30. In particular, after an adhesive agent is applied on an outer circumferential surface of the optical element holder 22 mounted on the photographic subject side of the lens barrel 30, the front case part 11 is pushed along the outer circumferential surface of the optical element holder 22 from the photographic subject side, and the front case part 11 is firmly fixed on the photographic subject side of the lens barrel 30 with the adhesive agent. The front case part 11 can be bonded on the fixing wall body 50. In this case, there is an advantage in that an adhesive agent does not cling to an optical surface.

There is another method such that a lens barrel and a fixing wall body are fixed firstly, and a case part is fixed, and then an electrical component mounted circuit board part is fixed, other then the above explanation. However, if a method is such that an electrical component mounted circuit board part is fixed to an assembly where a lens barrel and a fixing wall body have been fixed, and then a case part is fixed to the assembly, the same assembly can be applied to a case part in a different shape, and can be assembled by the same assembly machine (a positioning machine for the electrical component mounted circuit board part, or the like). Therefore, a case part which is different in design can be applied, and the degree of freedom in design of a case body is high. In order to mount the case body to the assembly where a positional relationship among the lens barrel, the fixing wall body and the electrical component mounted circuit board part has been adjusted and fixed, the case part is only pushed in until the case part comes into contact with the lens barrel, and therefore assembling is easy.

At this time, a side face on the photographic subject side of the rear convex part 31b is in close contact with the level difference 11c of the front case part 11. The O-ring 32 is fitted in the O-ring groove 31c of the side face of the rear convex part 31b. When the side face on the photographic subject side of the rear convex part 31b comes into close contact with the level difference 11c, the O-ring 32 is squashed, and it is possible to maintain airtightness in the lens barrel 30 furthermore.

In a bond structure via the member 60 for fixing, the adhesive agents 62 and 63, which are ultraviolet curing adhesive agents, are applied to the member 60 for fixing, and the fixing wall body 50 and the electrical component mounted circuit board part 70 are bonded in a state of being positioned. Due to a holding force of surface tension of the adhesive agents 62 and 63, the member 60 for fixing does not fall if the member 60 for fixing is not held. In that state, when ultraviolet light is illuminated by the an ultraviolet generator (not illustrated), the fixing wall part 50 integrated with the lens barrel 30 and the electrical component mounted circuit board part 70 are capable of being fixed in a state where their relative positions are hardly moved. Needless to say, assembling is performed such that the adhesive agents 62 and 63 do not cling to a part of the optical element group 40 that functions optically.

Subsequently, the assembly where the electrical component mounted circuit board part 70 has been mounted is removed from the assembly machine. And, the adhesive agent 64, which is a heat curing adhesive agent, is filled in the gap between the fixing wall body 50 and the circuit board 71, and heated by an oven or the like, and the adhesive agent 64 is hardened. As the adhesive agent 64, an adhesive agent having a lightproof function is used, and light that enters between the fixing wall body 50 and the circuit board 71 is blocked.

Figure 11A:
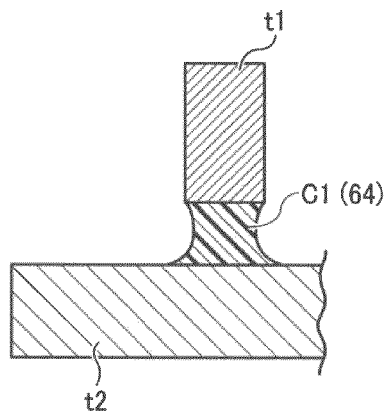
FIGS. 11A to 11D are diagrams explaining bond structures.

Next, the indirect bond structure and the gap-filling bond structure will be explained. As illustrated in FIGS. 11A to 11D, in a case where two members t1 and t2 separated from each other are in a state of being relatively positioned, and both members t1 and t2 are bonded with an adhesive agent, as illustrated in FIG. 11A, a state where both members t1 and t2 are in a state of being positioned and fixed, and the adhesive agent is applied to fill a gap between the member t1 and the member t2, and a bond layer C1 is formed (that is, gap-filling bond structure) is considered.

Figure 11B:
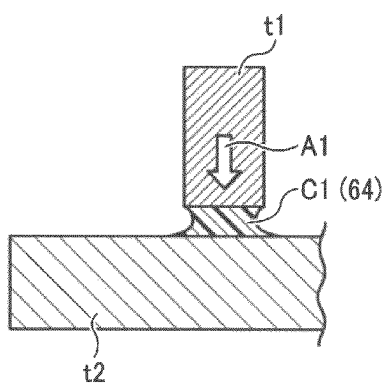

However, in a case of being bonded as described above, when the state where the members t1 and t2 have been relatively positioned and fixed is released, as illustrated in FIG. 11B, the member t1 and the member t2 are displaced from the state where they were relatively positioned, because the bond layer C1 shrinks when hardening (due to hardening shrinkage of the bond layer C1). In particular, in an example of FIG. 11B, the member t1 is greatly displaced in the direction of shrinking of a distance between the member t1 and the member t2 (direction of an arrow A1). Here, assuming that the member t1 is the lens barrel 30 in the present embodiment and the member t2 is the circuit board 71 (image sensor 72), a relative positional relationship in the direction of the photographing optical axis O between the optical element group 40 held in the lens barrel 30 and the image sensor 72 mounted on the circuit board 71 (distance from each other) is changed. That is, deterioration of the optical performance in the photographing optical system 20, namely deterioration of the optical performance in the imaging apparatus 10 is caused. Therefore, in the imaging apparatus 10 of the present embodiment, in order to prevent the relative positional relationship between the optical element group 40 and the image sensor 72 from changing, the indirect bond structure using the member 60 for fixing is adopted to bond the fixing wall body 50 and the electrical component mounted circuit board part 70 (circuit board 71).

Figure 11C:
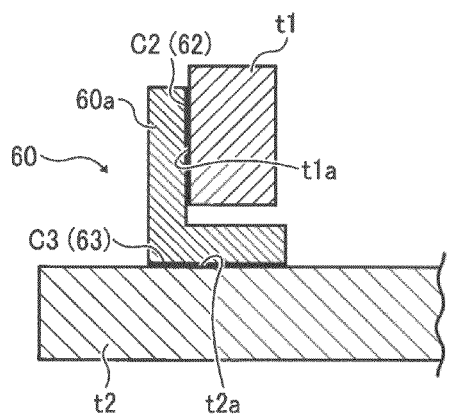
Figure 11D:
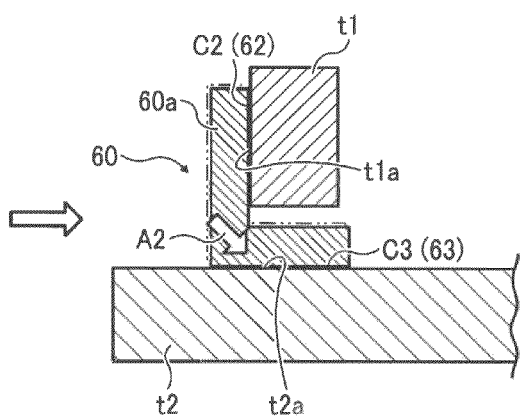

In the indirect bond structure, as illustrated in FIG. 11C, the dimensions of the member 60 for fixing used in the present embodiment are set based on the positional relationship between both members t1 and t2 which have been positioned. The dimensions based on the positional relationship between both members t1 and t2 are such that in a state where both members t1 and t2 have been positioned and fixed, a bonded part 60a on a fixing wall body side (the bonded part with the adhesive agent 62) is capable of coming into contact with a side face t1a of the member t1, and a bonded part 60b on the circuit board side (the bonded part with the adhesive agent 63) is capable of coming into contact with a top face t2b on the member t2. In the indirect bond structure, the member 60 for fixing is arranged with respect to both members t1 and t2 which have been positioned and fixed such that the bonded part 60a on the fixing wall body side comes into contact with the member t1 (side face t1a) via the bond layer C2 formed by applying the adhesive agent 62 and the bonded part 60b on the circuit board side comes into contact with the member t2 (top face t2a) via the bond layer C3 formed by applying the adhesive agent 63. Thus, a structure that both members t1 and t2 are positioned and fixed, and the member 60 for fixing is bonded on the member t1 (side face t1a) and the member t2 (top face t2a) with the bond layer C2 and the bond layer C3, respectively, and the bond layer C2 and the bond layer C3 are hardened in a state where there is no other restriction for the member 60 for fixing, and thereby a structure in which the member t1 and the member t2 are bonded and fixed via the member 60 for fixing is the indirect bond structure. In the indirect bond structure, after hardening the bond layer C2 and the bond layer C3, if the state where the member t1 and the member t2 have been positioned and fixed is released, as illustrated in FIG. 11D, a change hardly occurs in the positional relationship between the member t1 and the member t2. The following reason is considered.

Since the dimensions of the member 60 for fixing are set based on the positional relationship between both members t1 and t2, regardless of the distance (positional relationship) between the member t1 and the member t2, the bonded part 60a on the fixing wall body side is capable of coming into contact with the member t1 (side face t1a), and the bonded part 60b on the circuit board side is capable of coming into contact with the member t2 (top face t2a). Therefore, it is possible to make the bond layer C2 and the bond layer C3 extremely thin. And thus, since a hardening shrinkage amount in both bond layers C2 and C3 can be made to be extremely small, it is possible to make an influence on the positional relationship between both members t1 and t2 due to the hardening shrinkage of the bond layer C2 and the bond layer C3 extremely small. In the case of hardening both bond layers C2 and C3, the member 60 for fixing is in a state where the member 60 for fixing is bonded on both the members t1 and t2 which have been positioned and fixed with both bond layers C2 and C3, respectively, and there is no other restriction. Therefore, when the bond layer C2 and the bond layer C3 harden and shrink, the member 60 for fixing moves in the direction approaching both members t1 and t2 (direction of an arrow A2). Thus, an influence of the hardening shrinkage in the bond layer C2 and the bond layer C3 is absorbed by displacing the member 60 for fixing in the direction approaching both members t1 and t2 (direction of the arrow A2), and therefore it is possible to make an influence on the positional relationship between both members t1 and t2 due to the hardening shrinkage of the bond layer C2 and the bond layer C3 extremely small.

In the present embodiment, by the indirect bond structure using four members 60 for fixing, the electrical component mounted circuit board part 70 is bonded on the fixing wall body 50. The four members 60 for fixing are respectively provided at an equal angular interval in a circumferential direction of the lens barrel 30. In the present embodiment, since the ultraviolet curing adhesive agent is adopted as each of the adhesive agents 62 and 63, each member 60 for fixing is formed by a material which allows at least ultraviolet transmission.

In the present embodiment, the member 60 for fixing has the letter L shape in cross-section, however if faces on which the adhesive agents 62 and 63 are applied are ensured, the cross-section of the member 60 for fixing can be any shape. Each of the adhesive agents 62 and 63 is not necessary to be the ultraviolet curing adhesive agent, and if it is possible to hold a position of the electrical component mounted circuit board part 70 appropriately, a heat curing adhesive agent, or any other curing adhesive agent can be adopted. In that case, it is not necessary to use the material which allows ultraviolet transmission as the member 60 for fixing.

In the present embodiment, in a case where a plurality of kinds of imaging apparatuses are desired, it is not necessary to prepare the plurality of kinds of the lens barrel 30 and the fixing wall body 50. Accordingly, since the commonalization of components is achieved, it is possible to reduce the number of kinds of components, and a component control operation at an assembly site.

Since the electrical component mounted circuit board part 70 is fixed by the indirect bond structure and the gap-filling bond structure, a position change of the electrical component mounted circuit board part 70 when the adhesive agent hardens is small. Therefore, the lens barrel 30 and the image sensor 72 are accurately positioned and fixed. As a result, a stable image is obtained.

Normally, a plurality of lenses often constitute a lens (optical element group), and regarding each other's positional accuracy, it is necessary for the lens to be positioned by several micrometers. Therefore, highly-accurate manufacturing technology is needed for manufacture of the lens barrel.

On the other hand, as for an in-vehicle camera and a digital camera, various external shapes are often needed depending on the request of a user. Due to the diversity of users, the development of a variety of external shapes has advanced. Therefore, a change in the external shapes is often needed, even though an optical characteristic of the lens is the same. Presently, for the purpose of miniaturization and cost reduction, there is a case where a case body of a camera constituting its external shape and a lens barrel holding a lens is integrally manufactured, and in this case, a lens barrel is often manufactured integrally with a case body by resin molding.

As described above, a lens barrel needs to be manufactured with high accuracy. However, in a case where a case body and a lens barrel are integrally-molded, due to a thickness deviation caused by an influence of a shape of the case body and an unevenness of a resin streak occurring in a mold, the manufacture of a highly-accurate lens barrel is difficult. In order to solve this, higher technologies such as changing conditions of molding, performing additional processing of the mold, or the like are needed, and generally, they are not easy to perform. And, in a case where a case body having a lens barrel function has a complex shape, a deformation of the case body caused by an influence of usage and storage surroundings (in particular, temperature) causes a change in a position of a lens, and this may lead to a deterioration of the optical characteristic. Therefore, in order to ensure the optical characteristic, there is a case where the shape of the case body has to be changed.

The point is, in the case where the case body and the lens barrel are integrally-molded, if an optical system is the same and only an external shape is different, there is a case where higher processing may be needed to be performed on the lens barrel, or the external shape may be limited to ensure the optical characteristic.

Since a photographing direction and a photographing range of a camera are determined by a direction of a lens barrel, an optical axis of the camera (optical axis of the lens barrel) and a direction of the case body need to correspond in a certain range. If those are displaced, a direction of the camera and the optical axis are displaced, and desired photographing direction and photographing range are not obtained. This damages camera performance, thus deteriorating the camera performance as a product.

The present embodiment makes it possible to easily solve the above conventional problem.

Second Embodiment

Figure 12:
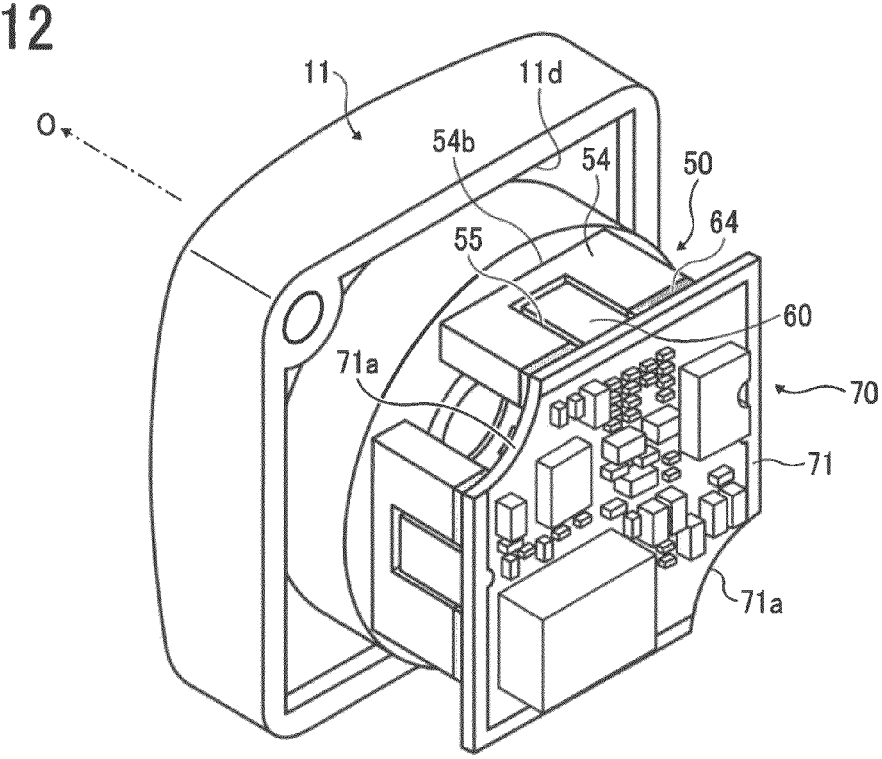
FIG. 12 is a perspective diagram illustrating a main part of an imaging apparatus according to a second embodiment.

FIG. 12 illustrates a second embodiment. In the present embodiment, as a positioning section which determines a position in the direction of rotation of the lens barrel 30, one side of the external shape of the front case part 11 (for example, upper side 11d) and one side of the fixing wall 54 of the fixing wall body 50 (for example, one side 54b of the fixing wall 54 in an upper part) are provided. In the circuit board 71 of the electrical component mounted circuit board part 70, two notches 71a are formed in two corners (corners in the diagonal direction).

In the present embodiment, as in the first embodiment, firstly, the lens barrel 30 and the fixing wall body 50 are fixed. Next, the circuit board 71 is fixed to the fixing wall body 50 in a state of being position-adjusted. And, the front case part 11 is mounted on an assembly including the lens barrel 30 and the fixing wall body 50 on which the circuit board 71 has been mounted. At this time, by use of an assembly machine (not illustrated), the front case part 11 is mounted on the lens barrel 30 on which the fixing wall body 50 has been mounted such that the upper side 11d and the one side 54b are approximately parallel. The front case part 11 is fitted in the lens barrel 30 by moving the assembly or the front case part 11 rotationally around the photographing optical axis O such that the upper side 11d and the one side 54b are parallel to an approximately parallel face provided on the assembly machine.

Thus, positioning of the front case part 11 and the fixing wall body 50 in the direction of rotation centering on the photographing optical axis O is performed. Since the notches 71a are formed in the corners of the circuit board 71 of the electrical component mounted circuit board part 70, it is easily possible to perform the positioning in the direction of rotation centering on each photographing optical axis O such that the assembly including the lens barrel 30 and the fixing wall body 50 on which the circuit board 71 has been mounted and the front case part 11 have a suitable positional relationship as described above. Therefore, in the case of imaging in a state where the front case part 11 is placed horizontally, an imaged image without a tilt in the horizontal direction is obtained.

According to the present embodiment, the front case part 11 and the fixing wall body 50 have positioning sections which determine the position in the direction of rotation centering on the photographing optical axis O, respectively, and the positioning in the direction of rotation is performed by the two positioning sections. Therefore, if the positioning of the electrical component mounted circuit board part 70 with respect to the fixing wall body 50 is performed beforehand, in the case where the front case part 11 is mounted on the assembly including the lens barrel 30 and the electrical component mounted circuit board part 70 on which the circuit board 71 has been mounted, a position of the electrical component mounted circuit board part 70 is determined with respect to the front case part 11. Thus, in the present embodiment, it is possible to assemble a case body and an optical system with high accuracy, and provide an imaging apparatus which obtains an imaged image without a tilt.

Third Embodiment

Figure 13:
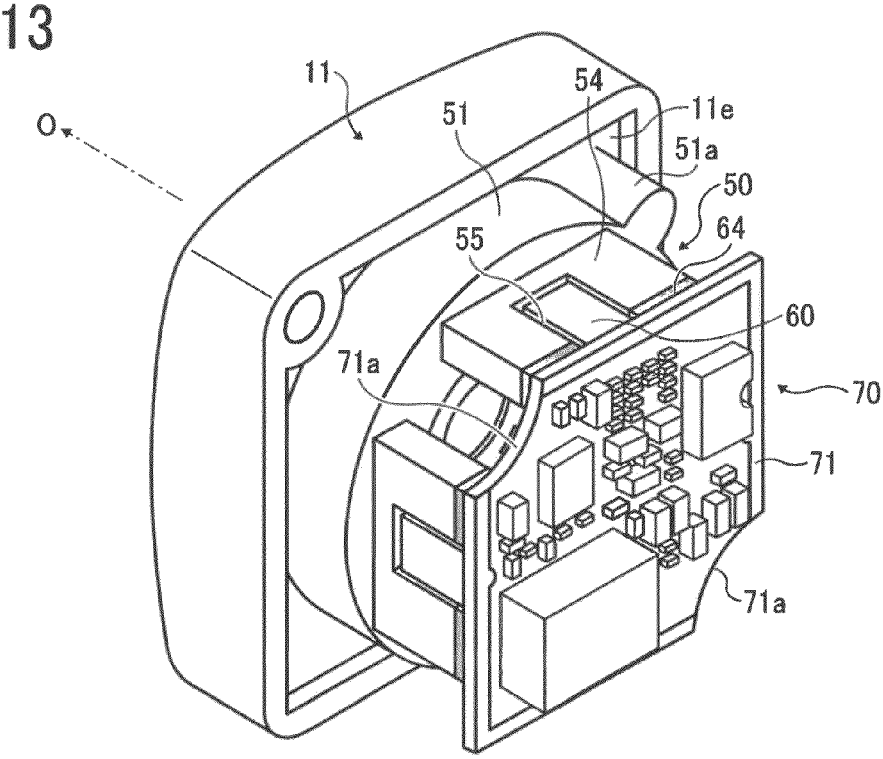
FIG. 13 is a perspective diagram illustrating a main part of an imaging apparatus according to a third embodiment.

FIG. 13 illustrates a third embodiment. In the present invention, a convex part 51a which determines a position of the front case part 11 in the direction of rotation is formed on an outer circumferential surface of the circular cylinder shaped part 51 of the fixing wall body 50. And a concave part 11e which determines a position of the front case part 11 in the direction of rotation is provided in a part of an external shape of the front case part 11. The convex part 51a extends in the direction of the photographing optical axis O, and is in contact with the concave part 11e of the front case part 11. Thus, positioning of the front case part 11 and the fixing wall body 50 in the direction of rotation centering on the photographing optical axis O is performed.

According to the present embodiment, since the concave part 11e which determines the position on the front case part 11 in the direction of rotation and the convex part 51a which determines the position of the fixing wall body 50 in the direction of rotation are positioned to come into contact with each other, without preparing an exclusive assembly machine, the positioning in the direction of rotation is reliably performed. As a result, it is possible to reduce an inferior positioning in the direction of rotation due to an assembly error or the like, and manufacture an imaging apparatus with good quality.

Fourth Embodiment

Figure 14:
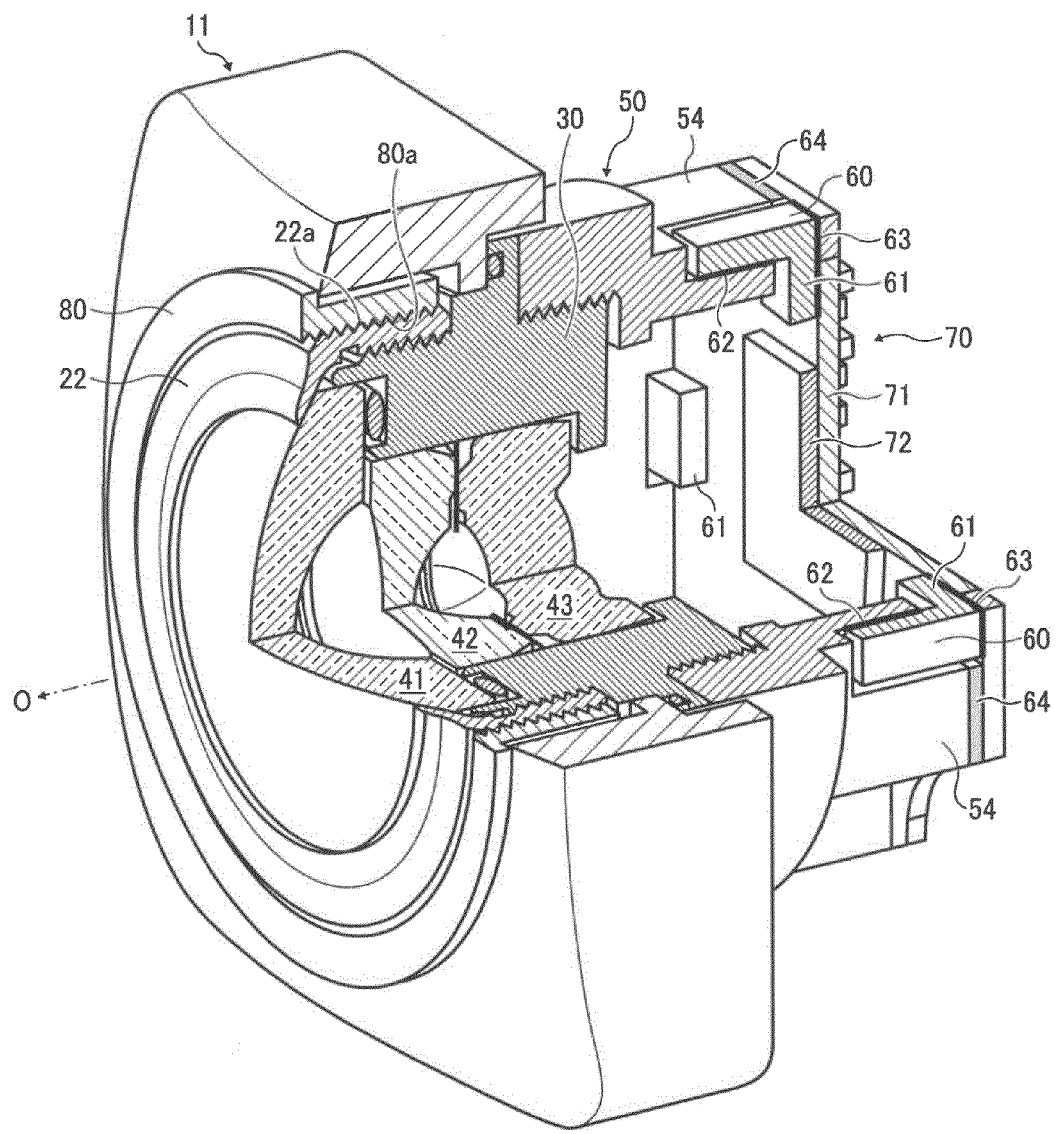
FIG. 14 is a perspective diagram illustrating a main part of an imaging apparatus according to a fourth embodiment.

FIG. 14 illustrates a fourth embodiment. In the present embodiment, as a constitution where the front case part 11 is fixed to the lens barrel 30, a constitution different from the above embodiments is adopted. In the present embodiment, the optical element holder 22 for fixing the optical element group 40 to a part on the photographic subject side of the lens barrel 30 is provided. And on an outer circumferential surface of the optical element holder 22, a screwing member 80 in a ring shape is provided. That is, a male screw thread 22a is formed on the outer circumferential surface of the optical element holder 22, and a female screw thread 80a is formed on an inner circumferential surface of the screwing member 80, and the male screw thread 22a and the female screw thread 80a are screwed together. The front case part 11 is bonded on an outer circumferential part of the screwing member 80.

According to the present embodiment, the front case part 11 is mounted on the lens barrel 30 via the screwing member 80. Therefore, it is possible to reliably fix the lens barrel 30 and the front case part 11, and obtain a firm and stable constitution. Accordingly, it is possible to suppress deterioration of an image caused by a constitutional factor of an imaging apparatus, and it is possible to obtain a stable image.

Fifth Embodiment

Figure 15:
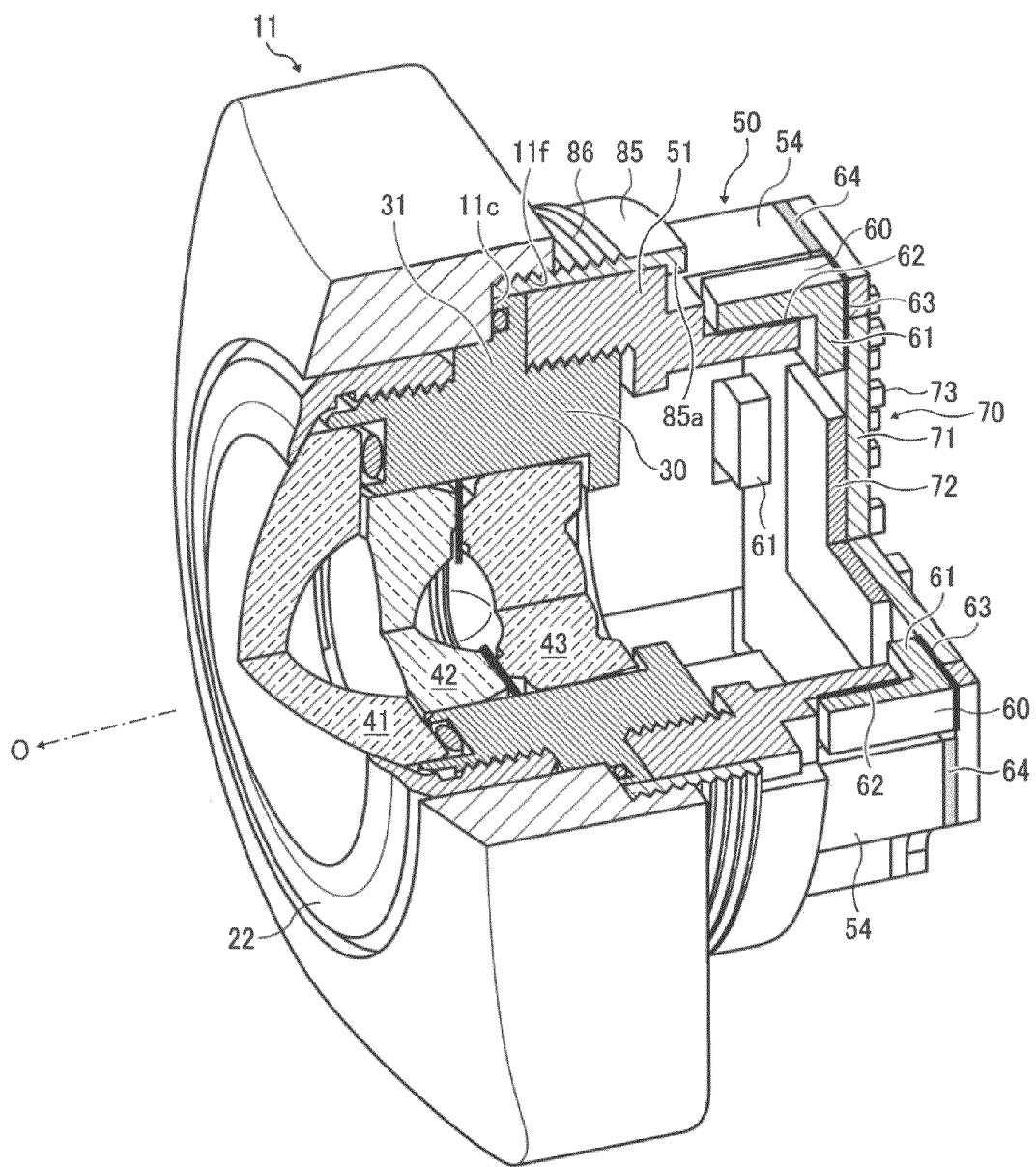
FIG. 15 is a perspective diagram illustrating a main part of an imaging apparatus according to fifth embodiment.

FIG. 15 illustrates a fifth embodiment. In the present embodiment, a pressing member 85 in a ring shape is provided between an outer circumferential surface of the fixing wall body 50 and an inner circumferential surface of the front case part 11. On an outer circumferential surface of the pressing member 85, a male screw thread 86 is formed, and on the circuit board side of the front case part 11, a female screw thread 11f is formed. On a circuit board side of the pressing member 85, a contact part 85a which comes into contact with an end part on the circuit board side of the circular cylinder shaped part 51 of the fixing wall body 50 is provided.

And, by screwing the male screw thread 86 on the female screw thread 11f and screwing the pressing member 85, the pressing member 85 moves to the photographic subject side along the photographing optical axis O, and the contact part 85a comes into contact with the end part on the circuit board side of the circular cylinder shaped part 51 of the fixing wall body 50. Therefore, the fixing wall body 50 and the lens barrel 30 move to the photographic subject side, and the convex part 31 of the lens barrel 30 comes into close contact with the level difference 11c of the front case part 11.

According to the present embodiment, the front case part 11 is fixed to the fixing wall body 50 via the female screw thread 11f and the male screw thread 86, and therefore it is possible to reliably fix the front case part 11 to the fixing wall body 50. As a result, it is possible to suppress deterioration of an image caused by a constitutional factor of an imaging apparatus, and it is possible to obtain a stable image.

Sixth Embodiment

Figure 16:
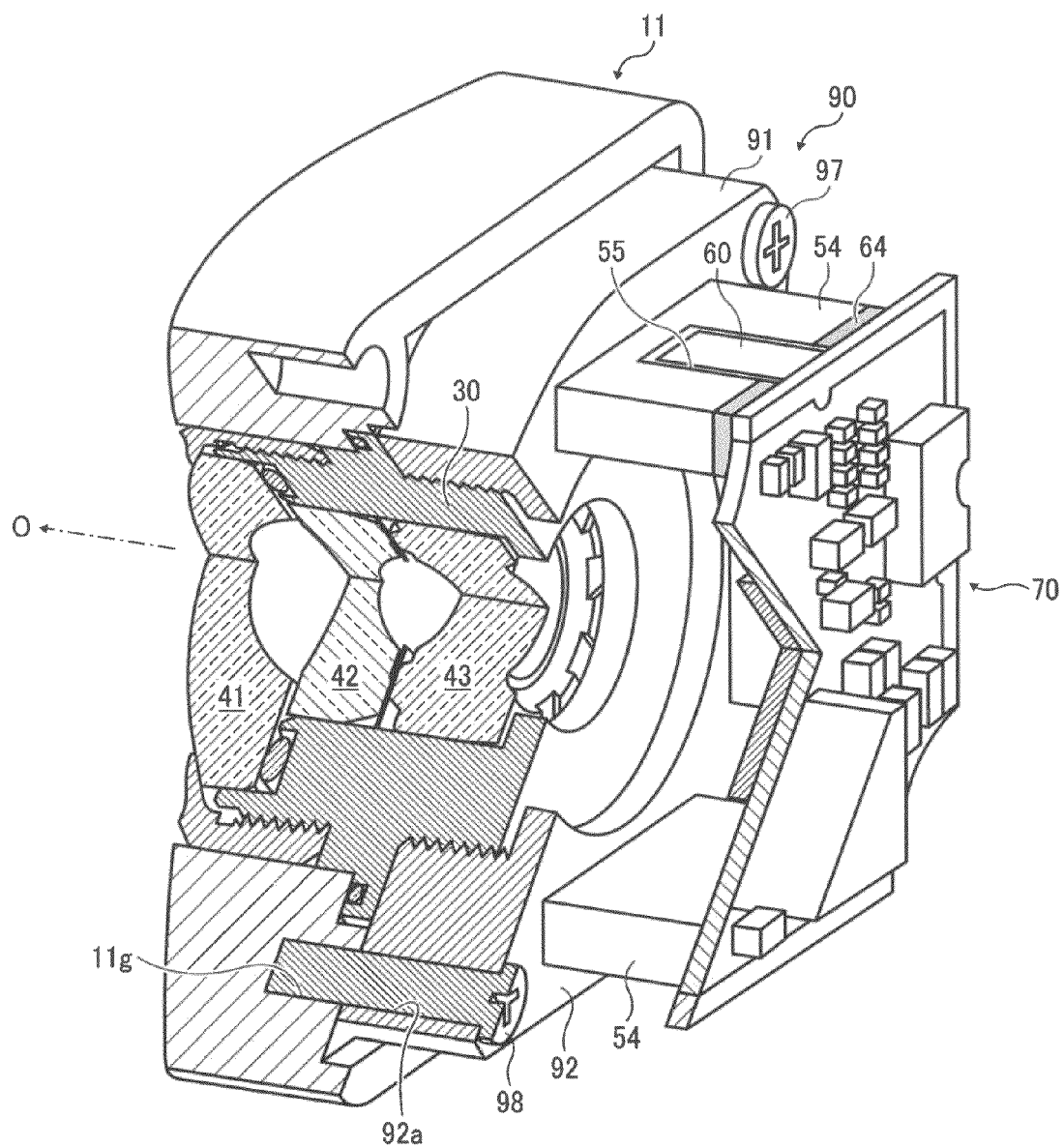
FIG. 16 is a perspective diagram illustrating a main part of an imaging apparatus according to a sixth embodiment.
Figure 17:
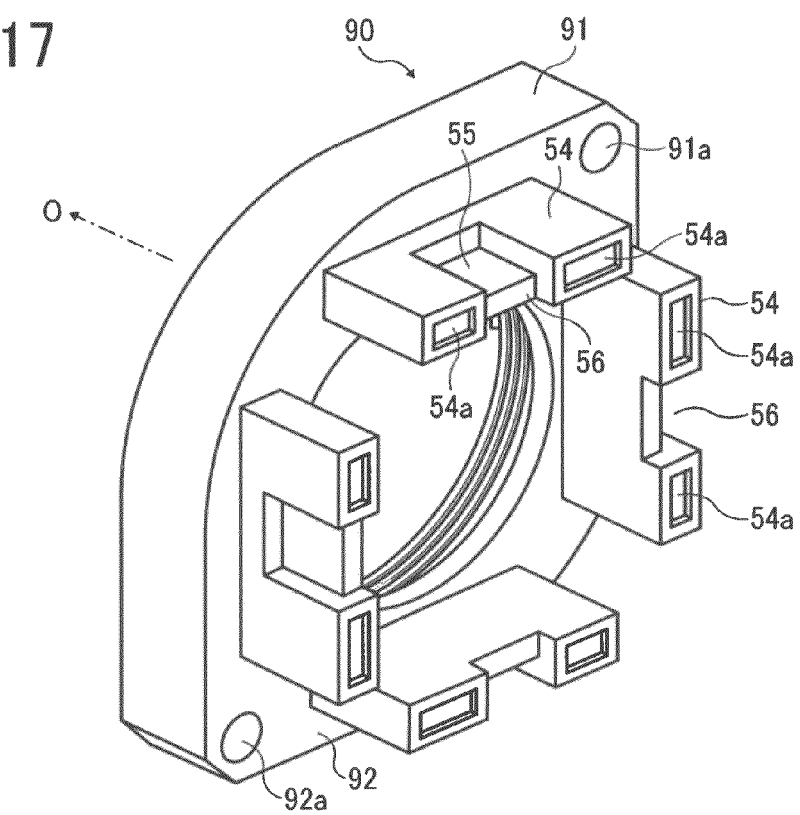
FIG. 17 is a perspective diagram of a fixing wall body used for the imaging apparatus illustrated in FIG. 16.
Figure 18:
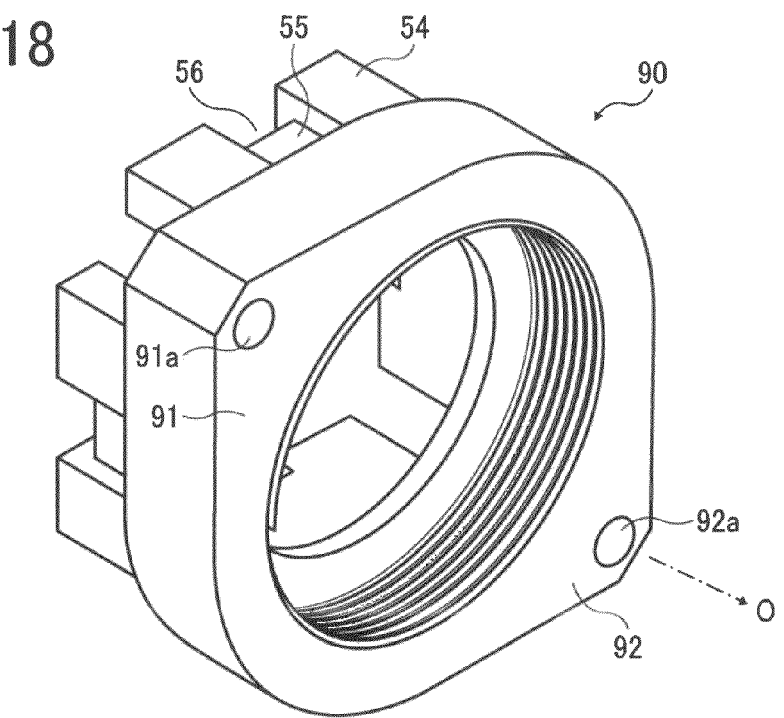
FIG. 18 is a perspective diagram of the fixing wall body of FIG. 17 seen from a different angle.

FIGS. 16 to 18 illustrate a sixth embodiment. In the present embodiment, a fixing wall body 90 in a different shape from the first to fifth embodiments is provided. In the fixing wall body 90, instead of the circular cylinder shaped part 51, bulging parts 91 and 92 are formed such that parts corresponding to corners of the front case part 11 bulge. The bulging parts 91 and 92 are disposed in positions facing each other across a center of the fixing wall body 90. A through-hole 91a, and a through-hole 92a are provided parallel to the photographing optical axis O in the bulging part 91, and in the bulging part 92, respectively.

On the other hand, on the circuit board side of the front case part 11, screw holes 11g and 11g (in FIG. 16, only one of the screw holes 11g and 11g is illustrated) are respectively formed corresponding to the through-holes 91a and 92a of the fixing wall body 90. The screw holes 11g and 11g are bottomed holes.

On the circuit board side of the fixing wall body 50, four fixing walls 54 are provided. On each of the fixing walls 54, the groove part 55 and the opening part 56 to set the member 60 for fixing as described in the first to fifth embodiments are formed. On each of an open end on the circuit board side of the fixing walls 54, a concave part 54a is formed.

In a case where the fixing wall body 90 where the electrical component mounted circuit board part 70 has been mounted is fixed to the front case part 11, firstly, the through-holes 91a and 92a of the fixing wall body 90 are brought into alignment with the screw holes 11g and 11g of the front case part 11, respectively. And a screw 97 is inserted in the through-hole 91a and an end part of the screw 97 is screwed in the screw hole 11g (not illustrated), and a screw 98 is inserted in the through-hole 92a and an end part of the screw 98 is screwed in the screw hole 11g (see FIG. 16). Therefore, the fixing wall body 90 is firmly fixed to the front case part 11.

Incidentally, in a state where an area of the electrical component mounted circuit board part 70 is large, and the electrical component mounted circuit board part 70 is mounted, and the screws 97 and 98 are not screwed, the following operation is performed.

Firstly, the optical element group 40 (including a member having an aperture function) is incorporated in the lens barrel 30. And then, the optical element holder 22 is screwed on the lens barrel 30. Next, the lens barrel 30 having the optical element group 40 is screwed on the fixing wall body 90. Then, the fixing wall body 90 and the front case part 11 are fixed by the screws 97 and 98. This assembly is installed to an assembly machine (not illustrated), and the electrical component mounted circuit board part 70 is mounted on the fixing wall body 90. The assembling method is the same as in the case of the first to fifth embodiments.

According to the present embodiment, positioning in the direction of rotation centering on the photographing optical axis O of the front case body 11 and the fixing wall body 90 is performed by screwing the screws 97 and 98 in the screw holes 11g and 11g, and it is easily possible to perform an adjustment in the direction of rotation centering on the photographing optical axis O.

According to the present embodiment, since the fixing wall body 90 and the front case part 11 are fixed by the screws 97 and 98, it is possible to reliably fix the fixing wall body 90 to the front case part 11, and therefore it is possible to improve waterproof and dustproof effects.

In the present embodiment, the through-holes 91a and 92a are formed in the fixing wall body 50, and the screw holes 11g and 11g having bottoms are formed in the front case part 11. However, to the contrary, a through-hole can be formed in the front case part 11, and a bottomed screw hole can be formed on the fixing wall body 50. In that case, if there is a gap between the screw inserted in the screw hole and the through-hole, there is a case where water enters the lens barrel 30, and therefore it is necessary to perform a waterproof treatment so as not to allow water to enter between the gap.

According to the embodiments of the present invention, in a case where several kinds of imaging apparatuses are desired to be prepared as a product line-up, for example, in a case where it is desired to obtain an imaging apparatus using a sensor in which a characteristic of a lens is the same and a thickness in the photographing optical axis direction is different, it is possible to deal with a lens barrel being the same and changing only a fixing wall body. And in a case where it is desired to obtain a sensor in which the characteristic of the lens is the different and the thickness in the photographing optical axis direction is the same, it is possible to deal with the fixing wall body being the same and changing a lens per lens barrel. Therefore, in a case where it is desired to obtain several kinds of imaging apparatuses, it is not necessary to prepare lens barrels and fixing wall bodies for the number of imaging apparatuses, and it is possible to achieve a commonalization of components, reduction in kinds of components, reduction in a component control operation at an assembly site, and so on. Additionally, it is possible to reduce an environmental impact.

And since the circuit board is fixed by the indirect bond structure and the gap-filling bond structure, a position change of the circuit board when the adhesive agent hardens is small, and it is possible to accurately fix the lens barrel and the image sensor. As a result, since a firm and stable constitution is obtained, it is possible to suppress deterioration of an image caused by a constitutional factor of the imaging apparatus, and it is possible to obtain a stable image.

According to the embodiments of the present invention, the front case part and the fixing wall body have positioning sections which determine a position in the direction of rotation centering on the optical axis, respectively, and positioning in the direction of rotation is performed by two positioning sections. Therefore, if positioning of the circuit board is performed beforehand with respect to the fixing wall body, the position of the circuit board with respect to the whole of the imaging apparatus (case body) is determined. Accordingly, it is possible to accurately mount the case body and the optical system, and provide an imaging apparatus that obtains an imaged image without a tilt.

According to the embodiments of the present invention, a positioning section that determines a position in the direction of rotation of the front case part is one side constituting the external shape of the front case part, and a positioning section that determines a position in the direction of rotation of the fixing wall body is one side of the fixing wall of the fixing wall body. Therefore, positioning in the direction of rotation is easily performed (each positioning section is in a state of being parallel to each other). As a result, it is possible to reliably obtain the same effect as the above-described effect.

According to the embodiments of the present invention, positioning is performed such that the positioning section that determines a position in the direction of rotation of the front case part and the positioning section that determines a position in the direction of rotation of the fixing wall body come into contact with each other, therefore it is possible to reliably perform the positioning in the direction of rotation, without preparing an exclusive assembly machine. As a result, it is possible to reduce an inferior positioning in the direction of rotation due to an assembly error or the like, and manufacture an imaging apparatus with good quality.

According to the embodiments of the present invention, the convex part and the concave part are in contact with each other, so that the lens barrel integrated with the fixing wall body is positioned in the front case part. Therefore, it is possible to fix the optical system accurately, and obtain a camera with good quality.

According to the embodiments of the present invention, since a large member for fixing which fixes the front case part to the fixing wall body is not necessary, this makes it possible to contribute to miniaturization of an imaging apparatus. And it is possible to perform fixation in the front case part, therefore the adhesive agent does not appear outside, and the degree of freedom in design of the external shape is high.

According to the embodiments of the present invention, the front case part is mounted on the lens barrel via the screwing member. Therefore, it is possible to reliably fix the lens barrel and the front case part, and obtain a firm and stable constitution. Thus, it is possible to suppress deterioration of an image caused by a constitutional factor of the imaging apparatus, and it is possible to obtain a stable image.

According to the embodiments of the present invention, since the fixing wall body is fixed to the front case part via the screw threads formed on the pressing member and the front case part, it is possible to reliably fix the front case part and fixing wall body, and obtain a firm and stable constitution. As a result, it is possible to suppress deterioration of an image caused by a constitutional factor of the imaging apparatus, and it is possible to obtain a stable image. And fixation is performed in the front case part, therefore the member for fixing does not appear outside, and the degree of freedom in design of the external shape is high.

According to the embodiments of the present invention, since the front case part and the fixing wall body are fixed by the screws, it is possible to reliably fix the front case part and the fixing wall body. And it is possible to improve waterproof and dustproof effects.

According to the embodiments of the present invention, in the level difference for positioning where the lens barrel and the front case part come into contact with each other, a waterproof member (an O-ring, or the like) is interposed. Therefore, the lens barrel and the front case part are in close contact with each other, and it is possible to improve the waterproof and dustproof effects in a part where the lens barrel and the front case part are in close contact with each other.

According to the embodiments of the present invention, the case body includes the front case part and the rear case part, and both of the front case part and the rear case part are mounted with each other, therefore it is possible to improve the waterproof and dustproof effects for the lens barrel, the electrical components, and the like in the case body. And it is possible to obtain a shockproof imaging apparatus.

According to the embodiments of the present invention, it is possible to block light which enters between the lens barrel and the image sensor, therefore it is possible to obtain a clear image.

According to the embodiments of the present invention, it is possible to provide an imaging apparatus which has good waterproof function and fixing strength, and additionally, it is possible to provide a camera having high-reliability and highly-accurate image quality. As a result, it is possible to provide a camera which captures a blind spot in high image quality and contribute to a driver assistance. And due to a high waterproof function, it is possible to contribute to the driver assistance even on rainy days.

According to the embodiments of the present invention, it is possible to achieve an imaging apparatus that is capable of commonalizing components among cameras having different specifications, maintaining a suitable optical characteristic and a stable sealing performance around the optical element, and ensuring the degree of freedom in design of a case body.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus comprising:
a lens barrel which holds at least one optical element;
an image sensor which converts an image of a photographic subject obtained by the optical element into an electrical signal;
a circuit board on which the image sensor is mounted;
a fixing wall body which is a different body from the lens barrel, and where the lens barrel is mounted to an end part of the fixing wall body on a photographic subject side, and the circuit board is mounted to an end part of the fixing wall body on a circuit board side opposite to the photographic subject side by a bond structure by an adhesive agent; and
a front case part which is provided on a photographic subject side of the lens barrel,
wherein in an intermediate part in an optical axis direction of the lens barrel on an outer circumferential surface of the lens barrel, a convex part that encircles the outer circumferential surface of the lens barrel is formed, a first screw thread is formed on the outer circumferential surface on the circuit board side opposite to the photographic subject side from the convex part of the lens barrel, a second screw thread that is screwed with the first screw thread is formed on an inner circumferential surface on the photographic subject side of the fixing wall body, and the lens barrel is screwed to a position where the convex part and the fixing wall body are in contact with each other, and is fixed,
wherein an optical element holder in a ring shape which holds the optical element is provided in a part on the photographic subject side of the lens barrel, and a third screw thread is formed on an inner circumferential part of the optical element holder and a fourth screw thread is formed on the outer circumferential surface on the photographic subject side from the convex part of the lens barrel, and by screwing the third screw thread and the fourth screw thread, the optical element holder is fixed to the lens barrel, and the optical element is fixed to the lens barrel,
wherein the convex part includes a front convex part and a rear convex part, the front and rear convex parts being disposed between the fourth screw thread formed on the photographic subject side from the convex part and the first screw thread formed on the circuit board side from the convex part, an outer diameter of the front convex part being smaller than an outer diameter of the rear convex part, and
wherein each of positioning sections which performs positioning of the front case part and the fixing wall body in a direction of rotation centering on an optical axis of the optical element is provided in the front case part and the fixing wall body, respectively.

2. The imaging apparatus according to claim 1, further comprising:
a member for fixing which fixes the circuit board on the fixing wall body,
wherein the bond structure includes:
an indirect bond structure which is provided between the fixing wall body and the member for fixing, and between the member for fixing and the circuit board, and where the fixing wall body and the circuit board are indirectly bonded via the member for fixing, and
a gap-filling bond structure which is provided between the fixing wall body and the circuit board, and where the fixing wall body and the circuit board are directly bonded.

3. The imaging apparatus according to claim 1, wherein the positioning section of the front case part is one side of an external shape constituting the front case part, and the positioning section of the fixing wall body is one side of a wall of the fixing wall body, and the positioning is performed such that the one side of the external shape constituting the front case part and the one side of the wall of the fixing wall body are approximately parallel to each other.

4. The imaging apparatus according to claim 1, wherein the positioning is performed such that the positioning section of the front case part and the positioning section of the fixing wall body are in contact with each other.

5. The imaging apparatus according to claim 1, wherein a convex part which performs positioning centering on the optical axis of the optical element is provided on an outer circumferential part of the fixing wall body, and a concave part which performs positioning centering on the optical axis of the optical element is provided in a part of an external shape of the front case part, and the positioning is performed such that the convex part and the concave part come into contact with each other.

6. The imaging apparatus according to claim 1, wherein the front case part is bonded to the fixing wall body.

7. The imaging apparatus according to claim 1, wherein a pressing member is provided between an outer circumferential surface of the fixing wall body and an inner circumferential surface of the front case part, and a screw thread formed on an outer circumferential surface on the pressing member is screwed on a screw thread formed on the inner circumferential surface of the front case part, so that the front case part is pressed to the lens barrel.

8. The imaging apparatus according to claim 1, wherein the fixing wall body is fixed to the front case part by a screw.

9. The imaging apparatus according to claim 1, wherein an elastic member for waterproofing is provided between a convex part provided on an outer circumferential part of the lens barrel and a level difference for positioning formed inside of the front case part.

10. The imaging apparatus according to claim 1, wherein a rear case part is mounted to an end part on a side opposite to the photographic subject side of the front case part, and the lens barrel, the fixing wall body, and the circuit board are hermetically closed by the front case part and the rear case part.

11. The imaging apparatus according to claim 2, wherein the adhesive agent used in the gap-filling bond structure is an adhesive agent having a lightproof function.

12. The imaging apparatus according to claim 1, further comprising:
   a screwing member in a ring shape which is disposed between the front case part and the optical element holder,
   wherein the screwing member is fixed to the front case part, and a fifth screw thread formed on an inner circumferential surface of the screwing member and a sixth screw thread formed on an outer circumferential surface of the optical element holder are screwed together, so that the lens barrel and the front case part are fixed.

13. An in-vehicle camera comprising the imaging apparatus according to claim 1.

14. The imaging apparatus according to claim 1, wherein a side on the wall on the photographic subject side of the rear convex part, an O-ring groove that encircles the convex part along the outer circumferential surface of the lens barrel is formed.

15. The imaging apparatus according to claim 14, wherein an O-ring is fitted in the O-ring groove.

16. The imaging apparatus according to claim 1, wherein the front convex part and the rear convex part are integrated.

17. An imaging apparatus comprising:
   a lens barrel which holds at least one optical element;
   an image sensor which converts an image of a photographic subject obtained by the optical element into an electrical signal;
   a circuit board on which the image sensor is mounted;
   a fixing wall body which is a different body from the lens barrel, and where the lens barrel is mounted to an end part of the fixing wall body on a photographic subject side, and the circuit board is mounted to an end part of the fixing wall body on a circuit board side opposite to the photographic subject side by a bond structure by an adhesive agent; and
   a front case part which is provided on a photographic subject side of the lens barrel,
   wherein in an intermediate part in an optical axis direction of the lens barrel on an outer circumferential surface of the lens barrel, a convex part that encircles the outer circumferential surface of the lens barrel is formed, a first fixing part is formed on the outer circumferential surface on the circuit board side opposite to the photographic subject side from the convex part of the lens barrel, a second fixing part that is connected with the first fixing part is formed on an inner circumferential surface on the photographic subject side of the fixing wall body, and the lens barrel is positioned at a position where the convex part and the fixing wall body are in contact with each other, and is fixed,
   wherein an optical element holder in a ring shape which holds the optical element is provided in a part on the photographic subject side of the lens barrel, and a third fixing part is formed on a part of the optical element holder and a fourth fixing part is formed on the photographic subject side from the convex part of the lens barrel, and by connecting the third fixing part and the fourth fixing part, the optical element holder is fixed to the lens barrel, and the optical element is fixed to the lens barrel,
   wherein the convex part includes a front convex part and a rear convex part, the front and rear convex parts being disposed between the fourth fixing part formed on the photographic subject side from the convex part and the first fixing part formed on the circuit board side from the convex part, an outer diameter of the front convex part being smaller than an outer diameter of the rear convex part, and
   wherein each of positioning sections which performs positioning of the front case part and the fixing wall body in a direction of rotation centering on an optical axis of the optical element is provided in the front case part and the fixing wall body, respectively.

18. The imaging apparatus according to claim 17, further comprising:
   a member for fixing which fixes the circuit board on the fixing wall body,
   wherein the bond structure includes:
   an indirect bond structure which is provided between the fixing wall body and the member for fixing, and between the member for fixing and the circuit board, and where the fixing wall body and the circuit board are indirectly bonded via the member for fixing, and
   a gap-filling bond structure which is provided between the fixing wall body and the circuit board, and where the fixing wall body and the circuit board are directly bonded.

19. The imaging apparatus according to claim 17, wherein the positioning section of the front case part is one side of an external shape constituting the front case part, and the positioning section of the fixing wall body is one side of a wall of the fixing wall body, and the positioning is performed such that the one side of the external shape constituting the front case part and the one side of the wall of the fixing wall body are approximately parallel to each other.

20. The imaging apparatus according to claim 17, wherein the positioning is performed such that the positioning section of the front case part and the positioning section of the fixing wall body are in contact with each other.

21. The imaging apparatus according to claim 17, wherein a convex part which performs positioning centering on the optical axis of the optical element is provided on an outer circumferential part of the fixing wall body, and a concave part which performs positioning centering on the optical axis of the optical element is provided in a part of an external shape of the front case part, and the positioning is performed such that the convex part and the concave part come into contact with each other.

22. The imaging apparatus according to claim 17, wherein an elastic member for waterproofing is provided between a convex part provided on an outer circumferential part of the lens barrel and a level difference for positioning formed inside of the front case part.

23. The imaging apparatus according to claim 17, wherein a rear case part is mounted to an end part on a side opposite to the photographic subject side of the front case part, and the lens barrel, the fixing wall body, and the circuit board are hermetically closed by the front case part and the rear case part.

24. The imaging apparatus according to claim 18, wherein the adhesive agent used in the gap-filling bond structure is an adhesive agent having a lightproof function.

25. The imaging apparatus according to claim 17, further comprising:
  a fixing member in a ring shape which is disposed between the front case part and the optical element holder,
  wherein the fixing member is fixed to the front case part, and a fifth fixing part formed on an inner circumferential surface of the fixing member and a sixth fixing part formed on an outer circumferential surface of the optical element holder are connected together, so that the lens barrel and the front case part are fixed.

26. An in-vehicle camera comprising the imaging apparatus according to claim 17.

27. The imaging apparatus according to claim 17, wherein a side on the wall on the photographic subject side of the rear convex part, an O-ring groove that encircles the convex part along the outer circumferential surface of the lens barrel is formed, an O-ring is fitted in the O-ring groove, and the front convex part and the rear convex part are integrated.

28. An imaging apparatus comprising:
  a lens barrel which holds at least one optical element;
  an image sensor which converts an image of a photographic subject obtained by the optical element into an electrical signal;
  a circuit board on which the image sensor is mounted;
  a fixing wall body which is a different body from the lens barrel, and where the lens barrel is mounted to an end part of the fixing wall body on a photographic subject side, and the circuit board is mounted to an end part of the fixing wall body on a circuit board side opposite to the photographic subject side; and
  a front case part which is provided on a photographic subject side of the lens barrel,
  wherein in an intermediate part in an optical axis direction of the lens barrel on an outer circumferential surface of the lens barrel, a convex part that encircles the outer circumferential surface of the lens barrel is formed, a first fixing part is formed on the outer circumferential surface on the circuit board side opposite to the photographic subject side from the convex part of the lens barrel, a second fixing part that is connected with the first fixing part is formed on an inner circumferential surface on the photographic subject side of the fixing wall body, and the lens barrel is positioned at a position where the convex part and the fixing wall body are in contact with each other, and is fixed,
  wherein an optical element holder which holds the optical element is provided in a part on the photographic subject side of the lens barrel, and a third fixing part is formed on a part of the optical element holder and a fourth fixing part is formed on the photographic subject side from the convex part of the lens barrel, and by connecting the third fixing part and the fourth fixing part, the optical element holder is fixed to the lens barrel, and the optical element is fixed to the lens barrel,
  wherein the convex part includes a front convex part and a rear convex part, the front and rear convex parts being disposed between the fourth fixing part formed on the photographic subject side from the convex part and the first fixing part formed on the circuit board side from the convex part, an outer diameter of the front convex part being different than an outer diameter of the rear convex part, and
  wherein each of positioning sections which performs positioning of the front case part and the fixing wall body in a direction of rotation centering on an optical axis of the optical element is provided in the front case part and the fixing wall body, respectively.

\* \* \* \* \*